(12) United States Patent
Adamo et al.

(10) Patent No.: US 12,533,418 B2
(45) Date of Patent: Jan. 27, 2026

(54) DOSAGE AND ADMINISTRATION OF A BACTERIAL SACCHARIDE GLYCOCONJUGATE VACCINE

(71) Applicant: GLAXOSMITHKLINE BIOLOGICALS SA, Rixensart (BE)

(72) Inventors: Roberto Adamo, Siena (IT); Giuseppe Del Giudice, Siena (IT); Sanjay Phogat, Siena (IT)

(73) Assignee: GLAXOSMITHKLINE BIOLOGICALS SA, Rixensart (BE)

( * ) Notice: Subject to any disclaimer, the term of this patent is extended or adjusted under 35 U.S.C. 154(b) by 870 days.

(21) Appl. No.: 17/773,637

(22) PCT Filed: Nov. 19, 2020

(86) PCT No.: PCT/IB2020/060901
§ 371 (c)(1),
(2) Date: May 2, 2022

(87) PCT Pub. No.: WO2021/099982
PCT Pub. Date: May 27, 2021

(65) Prior Publication Data
US 2022/0387614 A1    Dec. 8, 2022

(30) Foreign Application Priority Data

Nov. 22, 2019  (EP) ..................................... 19211046
Sep. 4, 2020   (EP) ..................................... 20194632

(51) Int. Cl.
| | |
|---|---|
| *A61K 47/64* | (2017.01) |
| *A61K 39/00* | (2006.01) |
| *A61K 39/09* | (2006.01) |
| *A61K 39/112* | (2006.01) |

(52) U.S. Cl.
CPC ........ *A61K 47/646* (2017.08); *A61K 39/0275* (2013.01); *A61K 39/092* (2013.01); *A61K 47/6415* (2017.08); *A61K 2039/545* (2013.01); *A61K 2039/6037* (2013.01)

(58) Field of Classification Search
CPC ............................ A61K 47/646; A61K 39/092
See application file for complete search history.

(56) References Cited

FOREIGN PATENT DOCUMENTS

| | | | |
|---|---|---|---|
| WO | WO2014/147044 A1 | * | 9/2014 |
| WO | WO2017/013548 A1 | * | 1/2017 |

OTHER PUBLICATIONS

Leroux-Roels et al., Vaccine, 2016; 34: 1786-1791 (Year: 2016).*
Ishola, et al., "Randomized Trial to Compare the Immunogenicity and Safety of a CRM or TT Conjugated Quadrivalent Meningococcal Vaccine in Teenagers who Received a CRM or TT Conjugated Serogroup C Vaccine at Preschool Age", Pediatric Infectious Disease Journal., vol. 34, No. 8, Aug. 1, 2015 (Aug. 1, 2015), pp. 865-874.
Lehner et al., "Immunogenicity of synthetic peptides derived from the sequences of a *Stroptococcus* mutans cell surface antigen in nonhuman primates", The Journal of Immunology, Williams & Wilkins Co., US, vol. 143, No. 8, Oct. 15, 1989 (Oct. 15, 1989), pp. 2699-2705.
Nolan, et al., "Immunogenicity and Safety of a Quadrivalent Meningococcal ACWY-tetanus Toxoid Conjugate Vaccine 6 Years After MenC Priming as Toddlers", Pediatric Infectious Disease Journal., vol. 38, No. 6, Jun. 1, 2019 (Jun. 1, 2019), pp. 643-650.
Pichichero, Michael E., "Protein carriers of conjugate vaccines: Characteristics, development and clinical trials", Human Vaccines & Immunotherapeutics,vol. 9, No. 12,Dec. 1, 2013 (Dec. 1, 2013), pp. 2505-2523.
Zughaier, Susu M., "Analysis of novel meningococcal vaccine formulations", Human Vaccines & Immunotherapeutics, vol. 13, No. 7; 2017; pp. 1728-1732.
International Search Report and Written Opinion in corresponding International Application No. PCT/IB2020/060901 mailed Apr. 12, 2021.

* cited by examiner

*Primary Examiner* — Brian Gangle
*Assistant Examiner* — Lakia J Jackson-Tongue

(57) ABSTRACT

The present invention provides a glycoconjugate for administration to a subject in a method comprising the steps of: (i) administering a first dose of glycoconjugate; (ii) subsequently administering a second dose of glycoconjugate; wherein the amount of glycoconjugate in the first dose or first and second doses are atypically low, and also related aspects.

8 Claims, 9 Drawing Sheets

DOSAGE AND ADMINISTRATION OF A BACTERIAL SACCHARIDE GLYCOCONJUGATE VACCINE

CROSS REFERENCE TO RELATED APPLICATIONS

This application is filed pursuant to 35 U.S.C. § 371 as a United States National Phase Application of International Patent Application Serial No. PCT/IB2020/060901 filed Nov. 19, 2020, which claims priority to European Patent Application Nos. 19211046.8 filed on Nov. 22, 2019, and 20194632.4 filed on Sep. 4, 2020. The entire contents of each of the foregoing applications are hereby incorporated by reference.

FIELD OF THE INVENTION

This invention is in the field of saccharide conjugate antigens, in particular prime and boost administration regimes and related aspects.

BACKGROUND

Saccharide conjugate antigens, also known as glycoconjugates, are obtained by covalently linking a saccharide to a carrier protein. Glycoconjugates have proven an efficacious and cost effective approach to vaccines for the prevention of *Haemophilus influenzae* type b (Schneerson, 1980), *Streptococcus pneumoniae* (Geno, 2015), *Neisseria meningitidis* A, C, W135 and Y (Pace, 2007) and *Salmonella typhi* (Acharya, 1987; Klugman 1987; Tacket, 1988).

Glycoconjugates have allowed limitations of unconjugated saccharide vaccines to be overcome. Saccharides are T cell independent antigens and, although they can be efficacious in adults, they often fail to evoke immunological memory and long-lived antibody production when used as a vaccine. Furthermore, the affinity maturation of the antibody response elicited by unconjugated saccharides is often lower than that induced by glycoconjugate vaccines. Subsequent vaccination with the same unconjugated saccharide antigen can even induce hyporesponsiveness (Pace, 2013; Jackson, 2013; Greenberg, 2014). The T cell help provided by protein epitopes present in glycoconjugates imparts to carbohydrates the capacity to induce a long lasting and boostable IgG antibody production, including in children below the age of two (Constantino, 2011). Glycoconjugate vaccines have been shown to reduce carriage or impact on the transmission of meningococci, while unconjugated saccharide antigen vaccines did not (Ramsey, 2003).

The tetravalent meningococcal vaccine Menveo is indicated for intramuscular administration (a) in children at 2 months of age as a 4-dose series at 2, 4, 6, and 12 months of age, (b) in children with a first dose at 7 months through to 23 months of age, as a 2-dose series with the second dose administered at least 3 months after the first dose; and (c) in individuals 2 years through to 55 years of age as a single dose. Each dose of Menveo contains 10 ug of MenA, 5 ug of MenC, 5 ug of MenW and 5 ug of MenY saccharide, separately conjugated to a total of 32.7 to 64.1 ug of CRM197 carrier, in a volume of 500 ul (Menveo Package Insert, September 2019).

The decavalent pneumococcal vaccine Synflorix is indicated for intramuscular administration (a) in children at 2 months as a 3-dose series at 2, 4 and 12 months of age; (b) in individuals above 65 years of age as a single dose; and (c) in children and adults aged from 2 to 64 years old who are at a higher risk of developing a pneumococcal infection than the general population as single dose. Each dose of Synflorix contains 1 ug of each of serotype 1, 5, 6B, 7F, 9V, 14 and 23F saccharide and 3 ug of each of serotype 4, 18C and 19F saccharide, separately conjugated to protein D, tetanus toxoid or diptheria toxoid carrier, individually adsorbed on aluminum phosphate in a volume of 500 ul (Synflorix Package Insert, November 2019).

The use of a $\frac{1}{5}$th fractional dose of MenACWY-TT vaccine given intradermally was shown to induce a good anti meningococcal antibody response in adult individuals primed 4-6 months earlier with the same $\frac{1}{5}$th fractional dose and worked better than priming and boosting with a $\frac{1}{10}$th fractional dose (Jonker, 2018).

Naïve infants may respond differently to adolescents and adults and recommended schedules may generate only 10 to 35% of the maximal antibody titer that the vaccine can induce (Rappuoli, 2018).

There remains a need for alternative or improved approaches to the administration of glycoconjugates. Such approaches may provide benefits such as reduced antigen use, increased immune response, improved quality of immune response, lower number of doses, longer lasting immune response and/or more rapid attainment of a protective response.

SUMMARY OF THE INVENTION

The present disclosure relates to compositions and methods useful in eliciting immune responses to glycoconjugate antigens.

The present invention provides a method of administering a glycoconjugate to a subject, said method comprising the steps of:
(i) administering a first dose of glycoconjugate;
(ii) subsequently administering a second dose of glycoconjugate;
wherein the amount of glycoconjugate in the first dose is $\frac{1}{5}$ to $\frac{1}{500}$ of the amount of glycoconjugate in the second dose.

Also provided is a glycoconjugate for administration to a subject in a method comprising the steps of:
(i) administering a first dose of glycoconjugate;
(ii) subsequently administering a second dose of glycoconjugate;
wherein the amount of glycoconjugate in the first dose is $\frac{1}{5}$ to $\frac{1}{500}$ of the amount of glycoconjugate in the second dose.

Additionally provided is the use of a glycoconjugate in the manufacture of a medicament for administration to a subject in a method comprising the steps of:
(i) administering a first dose of glycoconjugate;
(ii) subsequently administering a second dose of glycoconjugate;
wherein the amount of glycoconjugate in the first dose is $\frac{1}{5}$ to $\frac{1}{500}$ of the amount of glycoconjugate in the second dose.

Further provided is a kit comprising:
(i) a first dose of glycoconjugate;
(ii) a second dose of glycoconjugate;
wherein the amount of glycoconjugate in the first dose is $\frac{1}{5}$ to $\frac{1}{500}$ of the amount of glycoconjugate in the second dose.

The present invention also provides a method of administering a glycoconjugate to a subject, said method comprising the steps of:

(i) administering a first dose of 0.005 to 2 ug of glycoconjugate;
(ii) subsequently administering a second dose of 1 to 30 ug of glycoconjugate, wherein the amount of glycoconjugate in the second dose is at least twice the amount of glycoconjugate in the first dose.

The present invention also provides a method of administering a glycoconjugate to a subject, said method comprising the steps of:
(i) administering a first dose of 1/5 to 1/500 of a standard dose of glycoconjugate;
(ii) subsequently administering a second dose of 1/2 to 2-fold of a standard dose of glycoconjugate.

The present invention also provides a method of administering a glycoconjugate to a subject, said method comprising the steps of:
(i) administering a first dose of 0.005 to 2 ug of glycoconjugate;
(ii) subsequently administering a second dose of 0.005 to 2 ug of glycoconjugate, wherein the amount of glycoconjugate in the second dose is 1/2 to 5-fold the amount of glycoconjugate in the first dose.

The present invention also provides a method of administering a glycoconjugate to a subject, said method comprising the steps of:
(i) administering a first dose of 1/5 to 1/500 of a standard dose of glycoconjugate;
(ii) subsequently administering a second dose of 1/5 to 1/500 of a standard dose of glycoconjugate
wherein the amount of glycoconjugate in the second dose is 1/2 to 5-fold the amount of glycoconjugate in the first dose.

The present invention provides a method of administering a glycoconjugate to a subject, said method comprising the steps of:
(i) administering a first dose of glycoconjugate;
(ii) subsequently administering a second dose of glycoconjugate;
wherein the amount of glycoconjugate in the first dose is 1/20 to 1/5000 of the amount of glycoconjugate in the second dose.

Also provided is a glycoconjugate for administration to a subject in a method comprising the steps of:
(i) administering a first dose of glycoconjugate;
(ii) subsequently administering a second dose of glycoconjugate;
wherein the amount of glycoconjugate in the first dose is 1/20 to 1/5000 of the amount of glycoconjugate in the second dose.

Additionally provided is the use of a glycoconjugate in the manufacture of a medicament for administration to a subject in a method comprising the steps of:
(i) administering a first dose of glycoconjugate;
(ii) subsequently administering a second dose of glycoconjugate;
wherein the amount of glycoconjugate in the first dose is 1/20 to 1/5000 of the amount of glycoconjugate in the second dose.

Further provided is a kit comprising:
(i) a first dose of glycoconjugate;
(ii) a second dose of glycoconjugate;
wherein the amount of glycoconjugate in the first dose is 1/20 to 1/5000 of the amount of glycoconjugate in the second dose.

DETAILED DESCRIPTION

Figure 1:
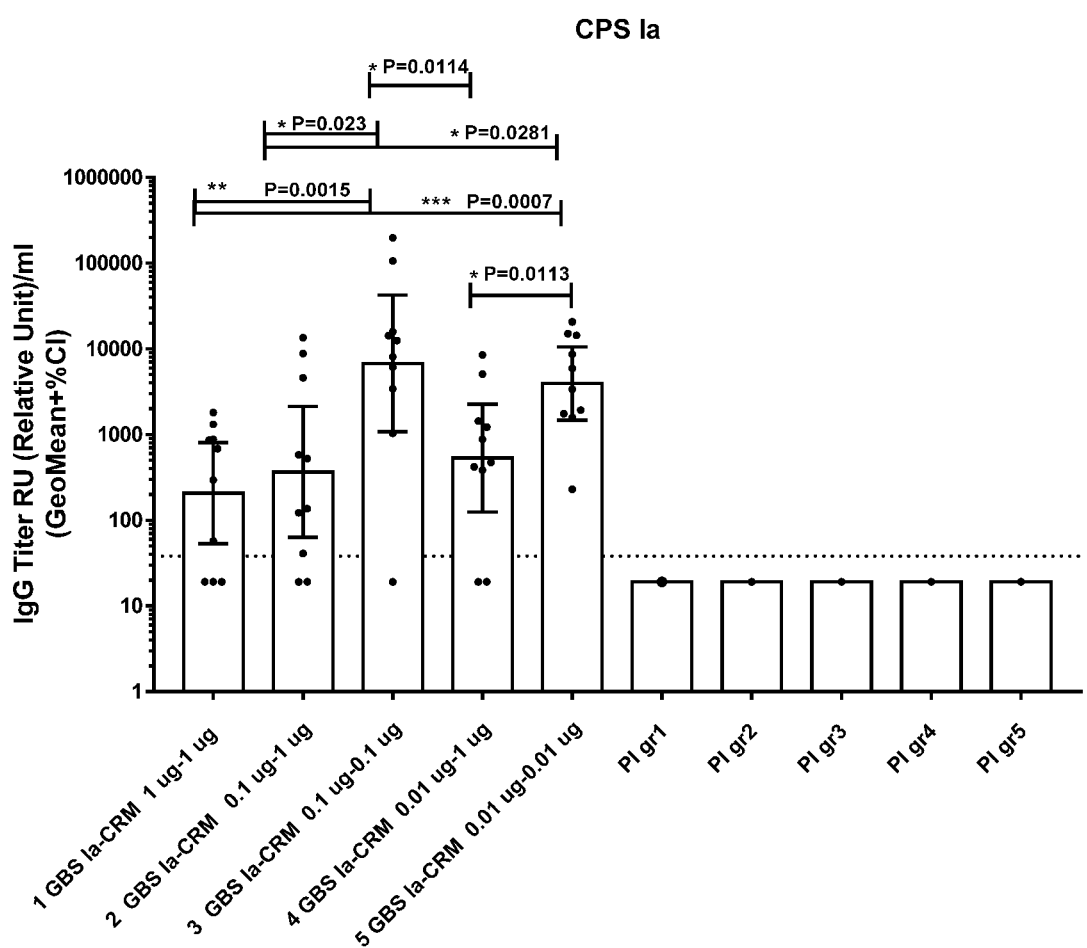
FIG. 1 GBS 1a IgG titres in mice pre-immunization (P1) and at Day 35 and following administration of GBS glycoconjugate vaccines as described in Example 1. Values for individual animals are shown (points) with geometric mean (columns) and confidence intervals (bars).
Figure 2:
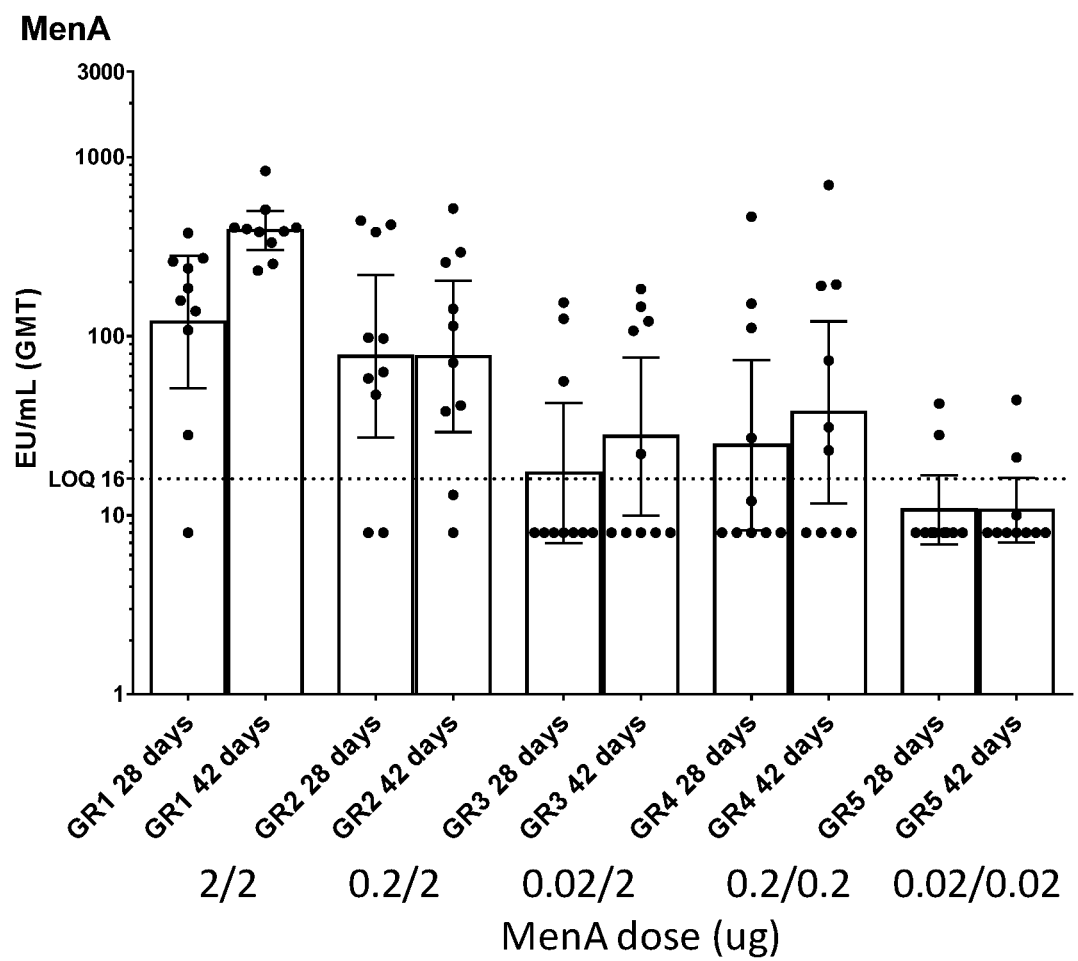
FIG. 2 MenA IgG titres in mice at Day 28 and Day 42 following administration of multivalent Men glycoconjugate vaccines as described in Example 2. Values for individual animals are shown (points) with geometric mean (columns) and confidence intervals (bars).
Figure 3:
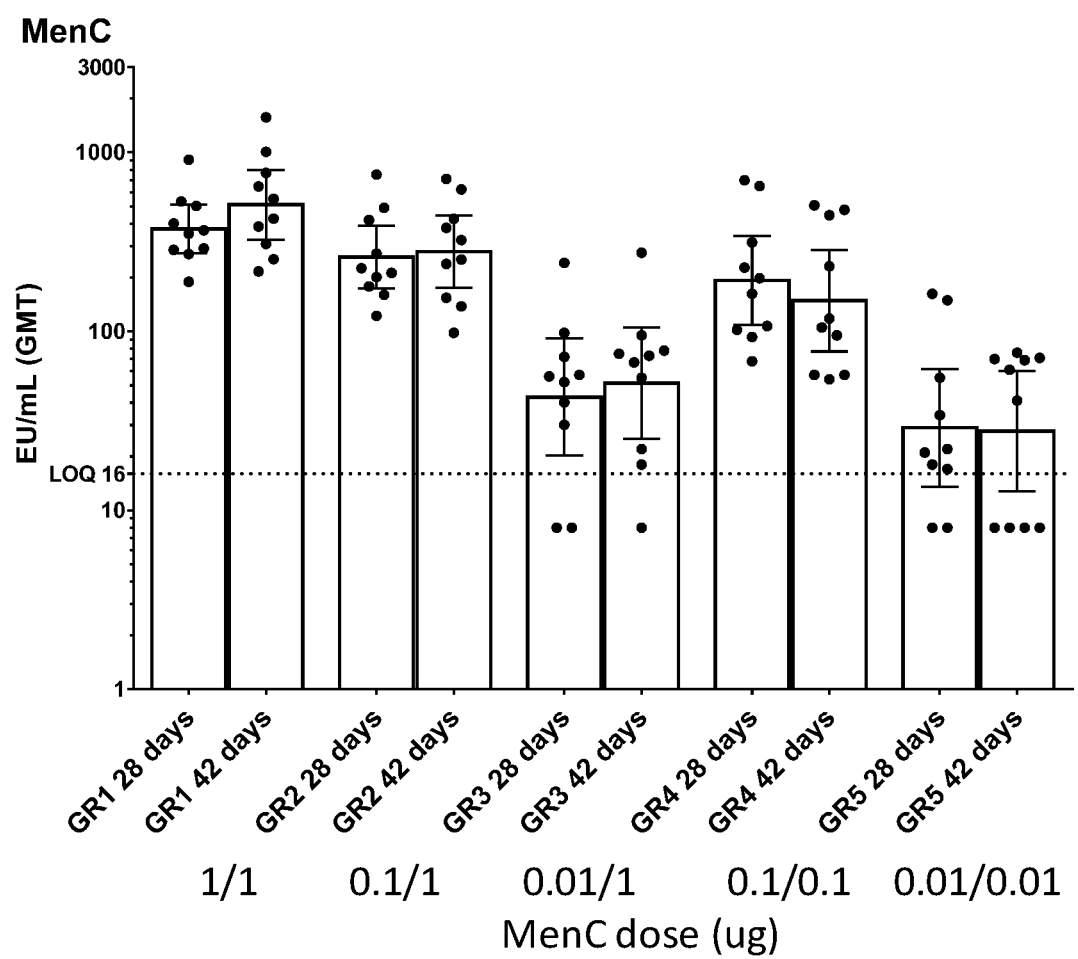
FIG. 3 MenC IgG titres in mice at Day 28 and Day 42 following administration of multivalent Men glycoconjugate vaccines as described in Example 2. Values for individual animals are shown (points) with geometric mean (columns) and confidence intervals (bars).
Figure 4:
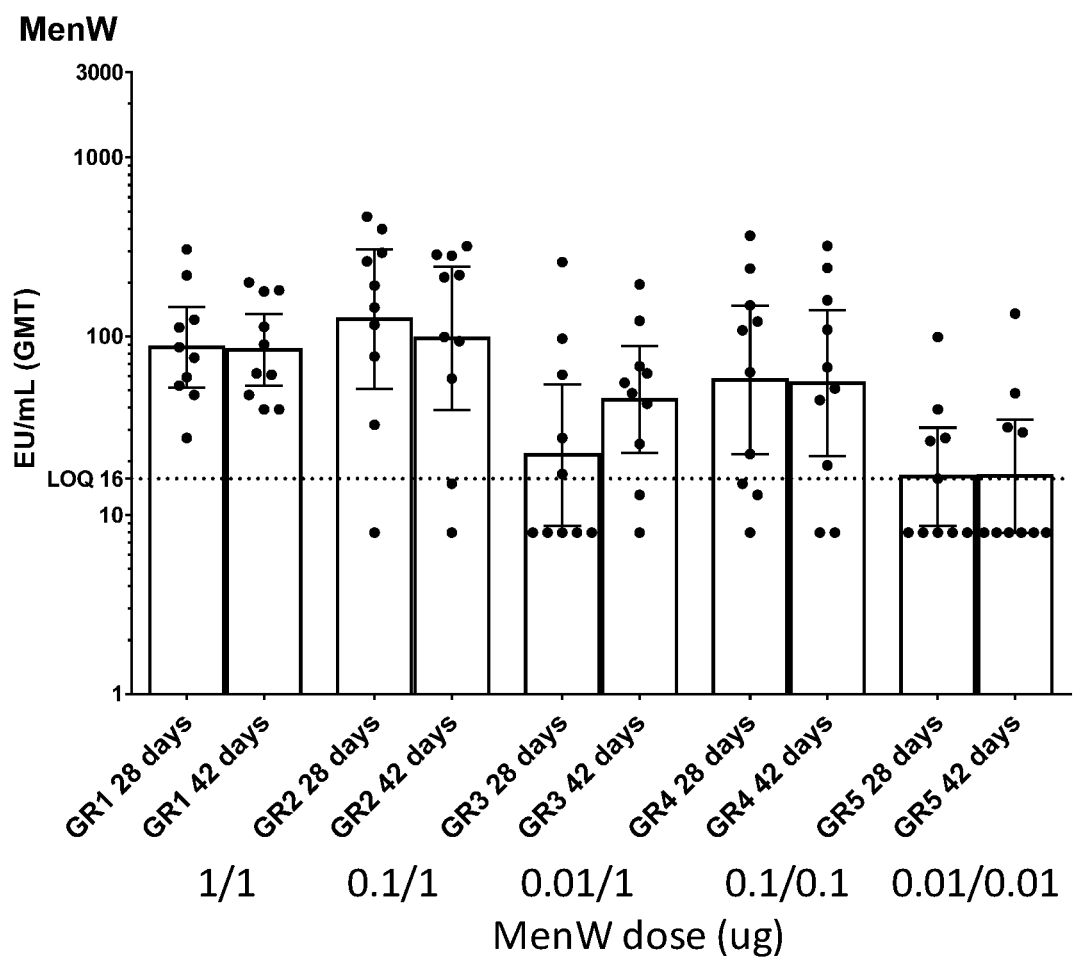
FIG. 4 MenW IgG titres in mice at Day 28 and Day 42 following administration of multivalent Men glycoconjugate vaccines as described in Example 2. Values for individual animals are shown (points) with geometric mean (columns) and confidence intervals (bars).
Figure 5:
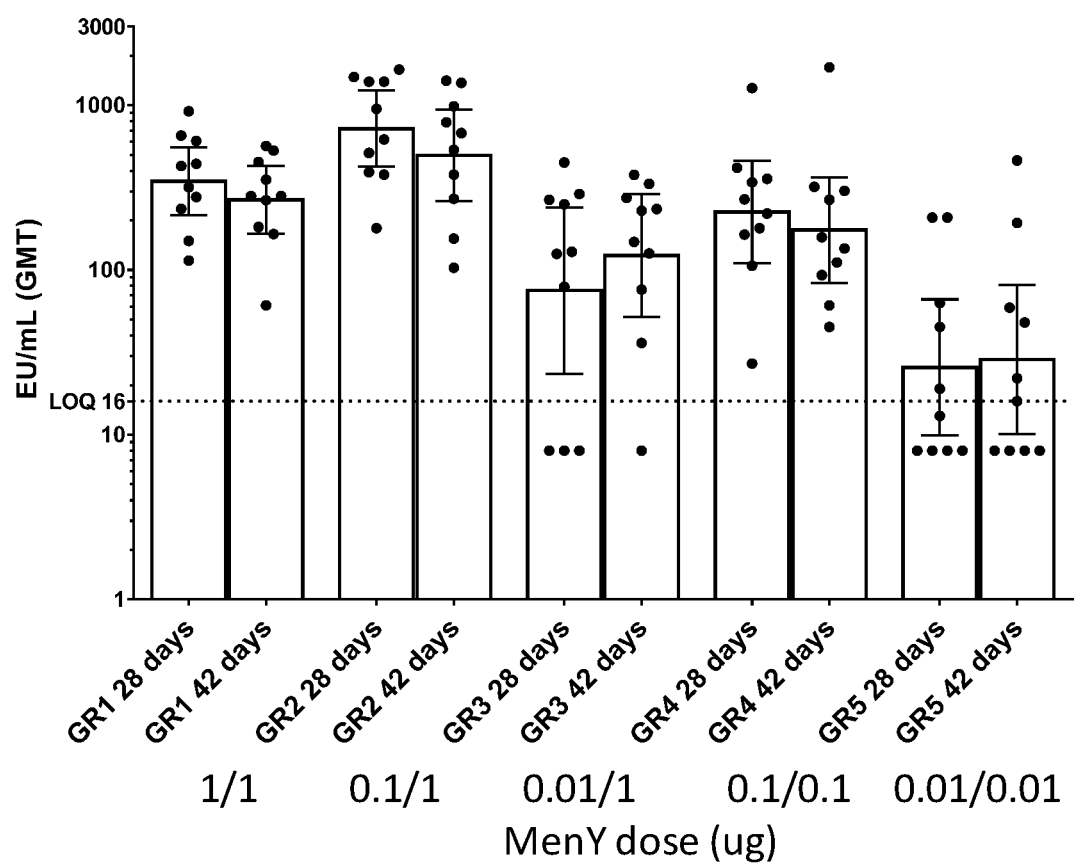
FIG. 5 MenY IgG titres in mice at Day 28 and Day 42 following administration of multivalent Men glycoconjugate vaccines as described in Example 2. Values for individual animals are shown (points) with geometric mean (columns) and confidence intervals (bars).
Figure 6:
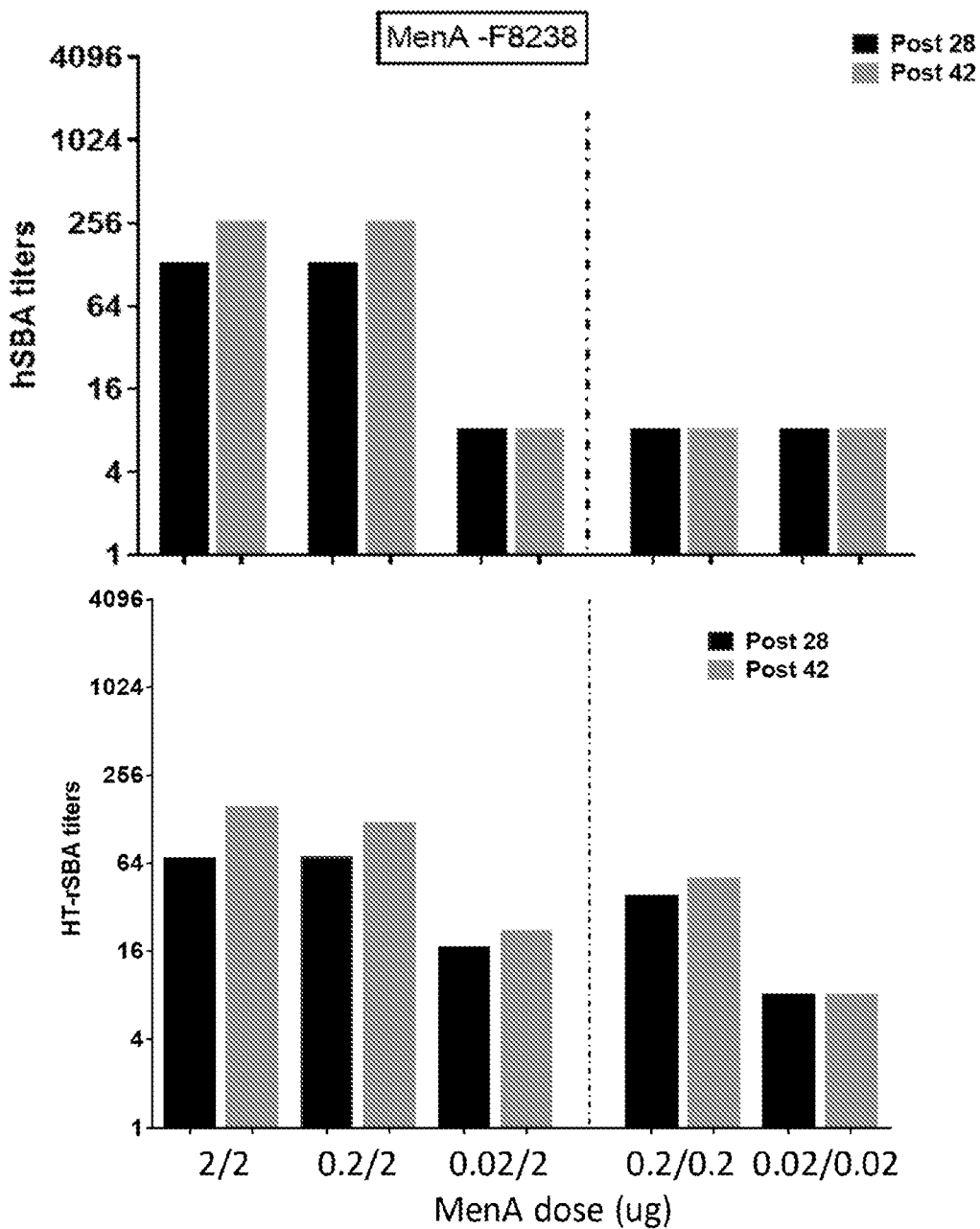
FIG. 6 MenA bactericidal assay results at Day 28 and Day 42 and following administration of multivalent Men glycoconjugate vaccines as described in Example 2: Human bactericidal assay using human plasma as complement source (hSBA)—top panel; baby rabbit complement (HT-rSBA)—bottom panel.
Figure 7:
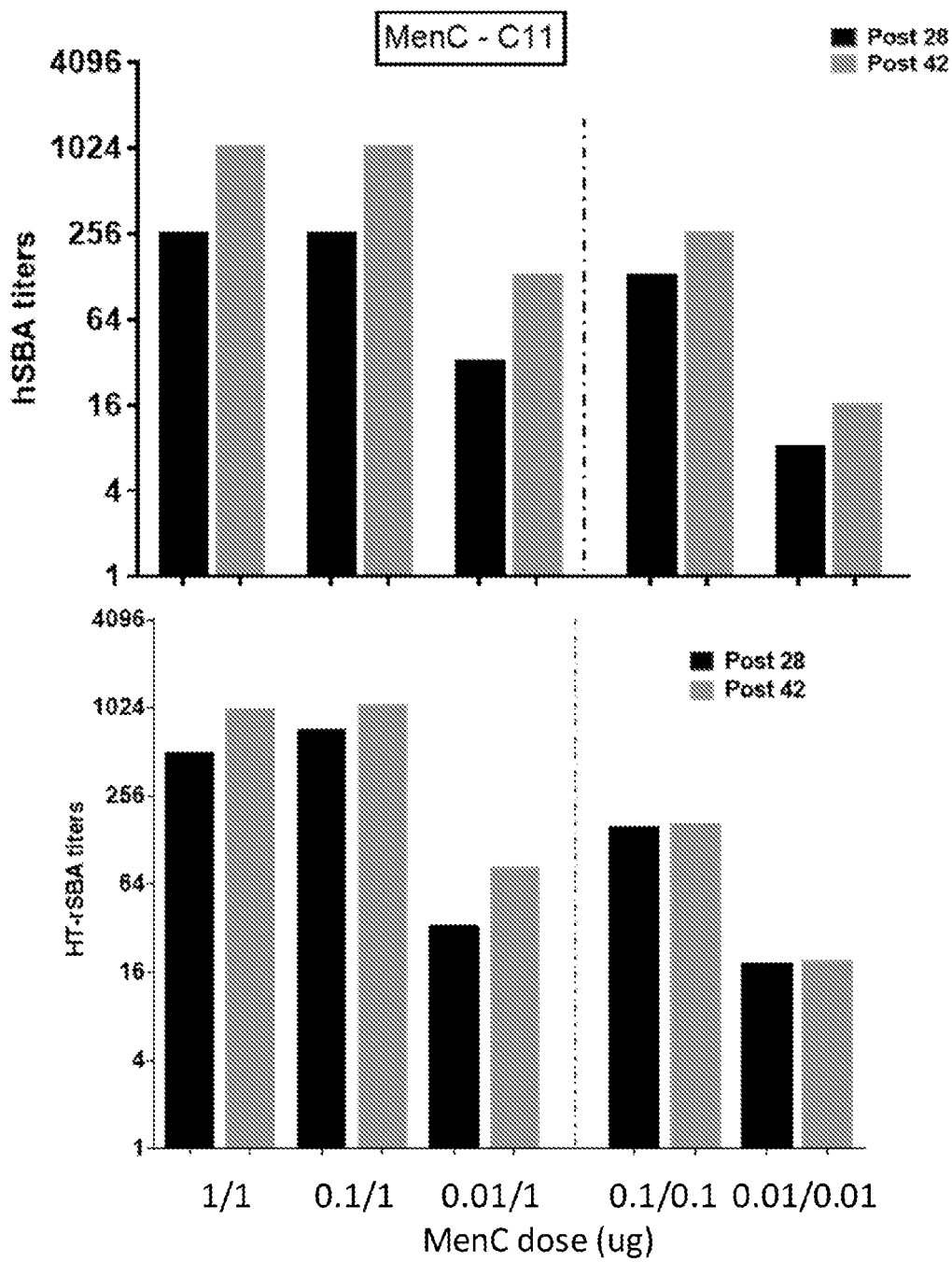
FIG. 7 MenC bactericidal assay results at Day 28 and Day 42 and following administration of multivalent Men glycoconjugate vaccines as described in Example 2: Human bactericidal assay using human plasma as complement source (hSBA)—top panel; baby rabbit complement (HT-rSBA)—bottom panel.
Figure 8:
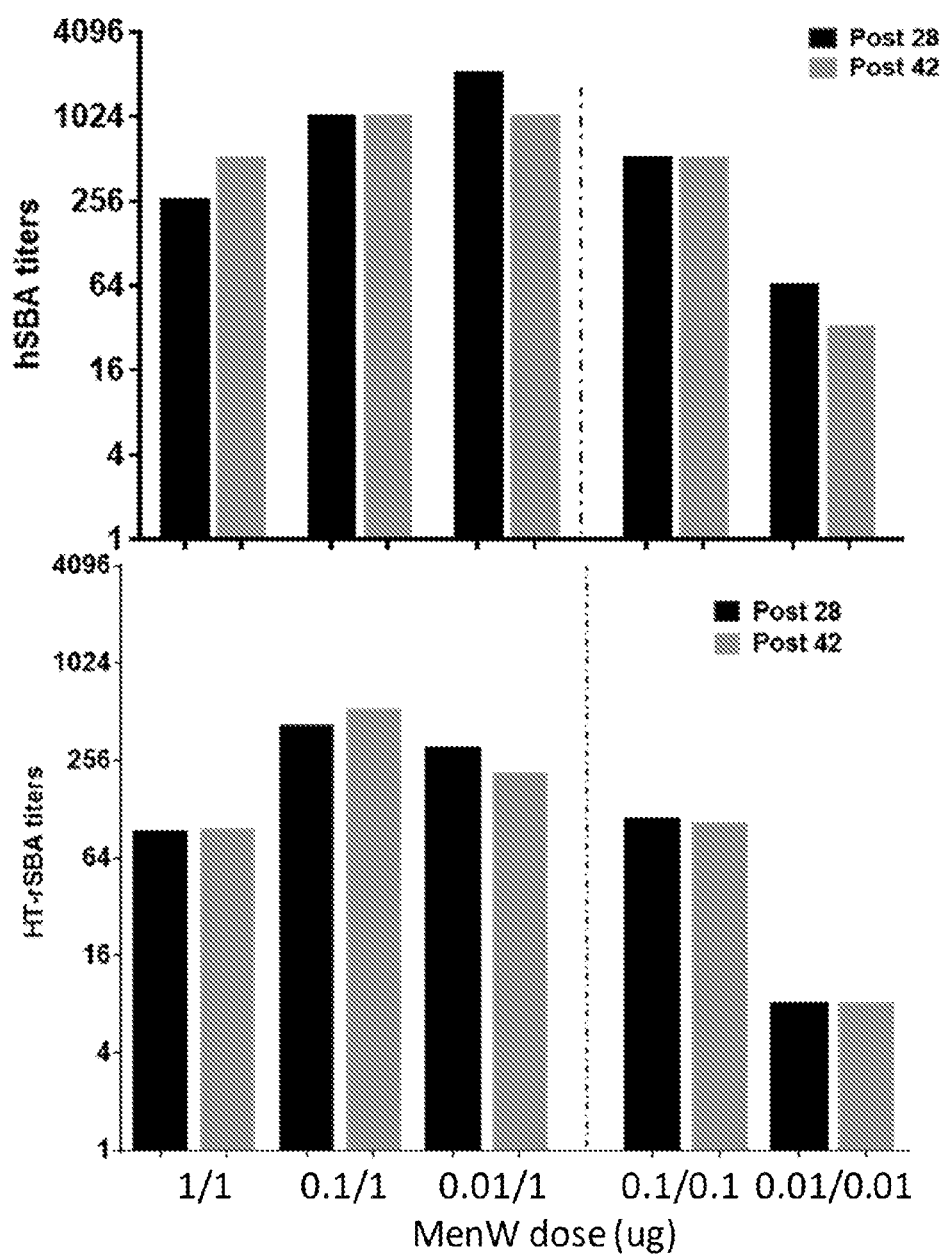
FIG. 8 MenW bactericidal assay results at Day 28 and Day 42 and following administration of multivalent Men glycoconjugate vaccines as described in Example 2: Human bactericidal assay using human plasma as complement source (hSBA)—top panel; baby rabbit complement (HT-rSBA)—bottom panel.

The present disclosure relates to compositions and methods useful in eliciting immune responses to glycoconjugate antigens.

The present invention provides a method of administering a glycoconjugate to a subject, said method comprising the steps of:
(i) administering a first dose of glycoconjugate;
(ii) subsequently administering a second dose of glycoconjugate;
wherein the amount of glycoconjugate in the first dose is 1/5 to 1/500 of the amount of glycoconjugate in the second dose.

The present invention also provides a method of administering a glycoconjugate to a subject, said method comprising the steps of:

(i) administering a first dose of 0.005 to 2 ug of glycoconjugate;
(ii) subsequently administering a second dose of 1 to 30 ug of glycoconjugate, wherein the amount of glycoconjugate in the second dose is at least twice the amount of glycoconjugate in the first dose.

The present invention also provides a method of administering a glycoconjugate to a subject, said method comprising the steps of:
(i) administering a first dose of ⅕ to ¹⁄₅₀₀ of a standard dose of glycoconjugate;
(ii) subsequently administering a second dose of ½ to 2-fold of a standard dose of glycoconjugate.

Also provided is a glycoconjugate for administration to a subject in a method comprising the steps of:
(i) administering a first dose of glycoconjugate;
(ii) subsequently administering a second dose of glycoconjugate;
wherein the amount of glycoconjugate in the first dose is ⅕ to ¹⁄₅₀₀ of the amount of glycoconjugate in the second dose.

Also provided is a glycoconjugate for administration to a subject in a method comprising the steps of:
(i) administering a first dose of 0.005 to 2 ug of glycoconjugate;
(ii) subsequently administering a second dose of 1 to 30 ug of glycoconjugate
wherein the amount of glycoconjugate in the second dose is at least twice the amount of glycoconjugate in the first dose.

Also provided is a glycoconjugate for administration to a subject in a method comprising the steps of:
(i) administering a first dose of ⅕ to ¹⁄₅₀₀ of a standard dose of glycoconjugate;
(ii) subsequently administering a second dose of ½ to 2-fold of a standard dose of glycoconjugate.

Additionally provided is the use of a glycoconjugate in the manufacture of a medicament for administration to a subject in a method comprising the steps of: administering a first dose of glycoconjugate;
(ii) subsequently administering a second dose of glycoconjugate;
wherein the amount of glycoconjugate in the first dose is ⅕ to ¹⁄₅₀₀ of the amount of glycoconjugate in the second dose.

Additionally provided is the use of a glycoconjugate in the manufacture of a medicament for administration to a subject in a method comprising the steps of:
(i) administering a first dose of 0.005 to 2 ug of glycoconjugate;
(ii) subsequently administering a second dose of 1 to 30 ug of glycoconjugate
wherein the amount of glycoconjugate in the second dose is at least twice the amount of glycoconjugate in the first dose.

Additionally provided is the use of a glycoconjugate in the manufacture of a medicament for administration to a subject in a method comprising the steps of:
(i) administering a first dose of ⅕ to ¹⁄₅₀₀ of a standard dose of glycoconjugate;
(ii) subsequently administering a second dose of ½ to 2-fold of a standard dose of glycoconjugate.

Further provided is a kit comprising:
(i) a first dose of glycoconjugate;
(ii) a second dose of glycoconjugate;
wherein the amount of glycoconjugate in the first dose is ⅕ to ¹⁄₅₀₀ of the amount of glycoconjugate in the second dose.

Further provided is a kit comprising:
(i) a first dose of 0.005 to 2 ug of glycoconjugate;
(ii) a second dose of 1 to 30 ug of glycoconjugate,
wherein the amount of glycoconjugate in the second dose is at least twice the amount of glycoconjugate in the first dose.

Further provided is a kit comprising:
(i) a first dose of ⅕ to ¹⁄₅₀₀ of a standard dose of glycoconjugate;
(ii) a second dose of ½ to 2-fold of a standard dose of glycoconjugate.

The present invention also provides a method of administering a glycoconjugate to a subject, said method comprising the steps of:
(i) administering a first dose of 0.005 to 2 ug of glycoconjugate;
(ii) subsequently administering a second dose of 0.005 to 2 ug of glycoconjugate,
wherein the amount of glycoconjugate in the second dose is ½ to 5-fold the amount of glycoconjugate in the first dose.

The present invention also provides a method of administering a glycoconjugate to a subject, said method comprising the steps of:
(i) administering a first dose of ⅕ to ¹⁄₅₀₀ of a standard dose of glycoconjugate;
(ii) subsequently administering a second dose of ⅕ to ¹⁄₅₀₀ of a standard dose of glycoconjugate
wherein the amount of glycoconjugate in the second dose is ½ to 5-fold the amount of glycoconjugate in the first dose.

Also provided is a glycoconjugate for administration to a subject in a method comprising the steps of:
(i) administering a first dose of 0.005 to 2 ug of glycoconjugate;
(ii) subsequently administering a second dose of 0.005 to 2 ug of glycoconjugate,
wherein the amount of glycoconjugate in the second dose is ½ to 5-fold the amount of glycoconjugate in the first dose.

Also provided is a glycoconjugate for administration to a subject in a method comprising the steps of:
(i) administering a first dose of ⅕ to ¹⁄₅₀₀ of a standard dose of glycoconjugate;
(ii) subsequently administering a second dose of ⅕ to ¹⁄₅₀₀ of a standard dose of glycoconjugate,
wherein the amount of glycoconjugate in the second dose is ½ to 5-fold the amount of glycoconjugate in the first dose.

Additionally provided is the use of a glycoconjugate in the manufacture of a medicament for administration to a subject in a method comprising the steps of:
(i) administering a first dose of 0.005 to 2 ug of glycoconjugate;
(ii) subsequently administering a second dose of 0.005 to 2 ug of glycoconjugate wherein the amount of glycoconjugate in the second dose is ½ to 5-fold the amount of glycoconjugate in the first dose.

Additionally provided is the use of a glycoconjugate in the manufacture of a medicament for administration to a subject in a method comprising the steps of:
(i) administering a first dose of ⅕ to ¹⁄₅₀₀ of a standard dose of glycoconjugate;
(ii) subsequently administering a second dose of ⅕ to ¹⁄₅₀₀ of a standard dose of glycoconjugate
wherein the amount of glycoconjugate in the second dose is ½ to 5-fold the amount of glycoconjugate in the first dose.

Further provided is a kit comprising:
(i) a first dose of 0.005 to 2 ug of glycoconjugate;
(ii) a second dose of 0.005 to 2 ug of glycoconjugate,
wherein the amount of glycoconjugate in the first dose is ½ to 5-fold of the amount of glycoconjugate in the second dose.

Further provided is a kit comprising:
(i) a first dose of ⅕ to 1/500 of a standard dose of glycoconjugate;
(ii) a second dose of ⅕ to 1/500 a standard dose of glycoconjugate,
wherein the amount of glycoconjugate in the first dose is ½ to 5-fold of the amount of glycoconjugate in the second dose.

The present invention provides a method of administering a glycoconjugate to a subject, said method comprising the steps of:
(i) administering a first dose of glycoconjugate;
(ii) subsequently administering a second dose of glycoconjugate;
wherein the amount of glycoconjugate in the first dose is 1/20 to 1/5000 of the amount of glycoconjugate in the second dose.

The present invention also provides a method of administering a glycoconjugate to a subject, said method comprising the steps of:
(i) administering a first dose of 0.0005 to 0.5 ug of glycoconjugate;
(ii) subsequently administering a second dose of 1 to 30 ug of glycoconjugate.

The present invention also provides a method of administering a glycoconjugate to a subject, said method comprising the steps of:
(i) administering a first dose of 1/10 to 1/2000 of a standard dose of glycoconjugate;
(ii) subsequently administering a second dose of ½ to 2-fold of a standard dose of glycoconjugate.

Also provided is a glycoconjugate for administration to a subject in a method comprising the steps of:
(i) administering a first dose of glycoconjugate;
(ii) subsequently administering a second dose of glycoconjugate;
wherein the amount of glycoconjugate in the first dose is 1/20 to 1/5000 of the amount of glycoconjugate in the second dose.

Also provided is a glycoconjugate for administration to a subject in a method comprising the steps of:
(i) administering a first dose of 0.0005 to 0.5 ug of glycoconjugate;
(ii) subsequently administering a second dose of 1 to 30 ug of glycoconjugate.

Also provided is a glycoconjugate for administration to a subject in a method comprising the steps of:
(i) administering a first dose of 1/10 to 1/2000 of a standard dose of glycoconjugate;
(ii) subsequently administering a second dose of ½ to 2-fold of a standard dose of glycoconjugate.

Additionally provided is the use of a glycoconjugate in the manufacture of a medicament for administration to a subject in a method comprising the steps of:
(i) administering a first dose of glycoconjugate;
(ii) subsequently administering a second dose of glycoconjugate;
wherein the amount of glycoconjugate in the first dose is 1/20 to 1/5000 of the amount of glycoconjugate in the second dose.

Additionally provided is the use of a glycoconjugate in the manufacture of a medicament for administration to a subject in a method comprising the steps of:
(i) administering a first dose of 0.0005 to 0.5 ug of glycoconjugate;
(ii) subsequently administering a second dose of 1 to 30 ug of glycoconjugate.

Additionally provided is the use of a glycoconjugate in the manufacture of a medicament for administration to a subject in a method comprising the steps of:
(i) administering a first dose of 1/10 to 1/2000 of a standard dose of glycoconjugate;
(ii) subsequently administering a second dose of ½ to 2-fold of a standard dose of glycoconjugate.

Further provided is a kit comprising:
(i) a first dose of glycoconjugate;
(ii) a second dose of glycoconjugate;
wherein the amount of glycoconjugate in the first dose is 1/20 to 1/5000 of the amount of glycoconjugate in the second dose.

Further provided is a kit comprising:
(i) a first dose of 0.0005 to 0.5 ug of glycoconjugate;
(ii) a second dose of 1 to 30 ug of glycoconjugate.

Further provided is a kit comprising:
(i) a first dose of 1/10 to 1/2000 of a standard dose of glycoconjugate;
(ii) a second dose of ½ to 2-fold of a standard dose of glycoconjugate.

Glycoconjugates

The glycoconjugates for use in the present invention are obtained by covalently linking a saccharide to a carrier protein. Glycoconjugates are well known in the art and extensive information is available regarding the choice of saccharide, carrier and their conjugation (see, e.g., Berti, 2018; Micoli, 2019). Glycoconjugates are therefore artificial constructs and not found in nature.

Saccharides

Any viral, fungal, bacterial or eukaryotic saccharide may be used in the preparation of glycoconjugates of use according to the present invention. Saccharides may simply be isolated from a source or isolated from the source and subsequently modified.

Modifications may include sizing (see for example EP497524 and EP497525; Szu, 1986), for instance by microfluidisation. Polysaccharides can be sized in order to reduce viscosity in polysaccharide samples and/or to improve filterability for conjugated products. Oligosaccharides have a low number of repeat units (typically 5-30 repeat units) and are typically hydrolyzed polysaccharides.

Suitable saccharides include bacterial saccharides, in particular bacterial capsular saccharides. Saccharides, such as bacterial capsular saccharides, may be derived from a bacterium selected from: *N. meningitidis* e.g. serogroup A (MenA), B (MenB), C (MenC), W135 (MenW), Y (MenY) or X (MenX); *Streptococcus pneumoniae* e.g. serotypes 1, 2, 3, 4, 5, 6A, 6B, 7F, 8, 9N, 9V, 10A, 11A, 12F, 14, 15B, 17F, 18C, 19A, 19F, 20, 22F, 23F or 33F; Group B *Streptococcus* e.g. group Ia, Ib, II, III, IV, V, VI, or VII; *Staphylococcus aureus* type 5; *Staphylococcus aureus* type 8; *Salmonella typhi* (Vi saccharide), *Vibrio cholerae* or *H. influenzae* type b.

The weight-average molecular weight of the saccharide may be 1000-2000000, 5000-1000000, 10000-500000, 50000-400000, 75000-300000 or 100000-200000 Da. The molecular weight or average molecular weight of a saccharide herein refers to the weight-average molecular weight (Mw) of the saccharide measured prior to conjugation and is measured by MALLS. The MALLS technique is well known in the art. For MALLS analysis of saccharides, two columns may be used in combination and the saccharides are eluted in water. Saccharides are detected using a light scattering detector (for instance Wyatt Dawn DSP equipped with a 10 mW argon laser at 488 nm) and an inferometric refractometer (for instance Wyatt Otilab DSP equipped with a P100 cell and a red filter at 498 nm). In an embodiment, the polydispersity of the saccharide is 1-1.5, 1-1.3, 1-1.2, 1-1.1 or 1-1.05 and after conjugation to a carrier protein, the polydispersity of the conjugate is 1.0-2.5, 1.0-2.0. 1.0-1.5, 1.0-1.2, 1.5-2.5, 1.7-2.2 or 1.5-2.0. All polydispersity measurements are by MALLS.

The saccharide may be either a native saccharide or may have been sized by a factor of no more than 2, 4, 6, 8, 10 or 20-fold (for instance by microfluidization [e.g. by Emulsiflex C-50 apparatus] or other technique(s) [for instance heat, chemical, oxidation, sonication methods]). Oligosaccharides may have been sized substantially further (for instance by known heat, chemical, or oxidation methods).

For the purposes of the invention, "native polysaccharide" refers to a saccharide that has not been subjected to a process, the purpose of which is to reduce the size of the saccharide. A polysaccharide can become slightly reduced in size during normal purification procedures. Such a saccharide is still native. Only if the polysaccharide has been subjected to sizing techniques or other deliberate modification would the polysaccharide not be considered native.

For the purposes of the invention, "sized by a factor up to ×2" means that the saccharide is subject to a process intended to reduce the size of the saccharide but to retain a size more than half the size of the native polysaccharide. ×3, ×4 etc. are to be interpreted in the same way i.e., the saccharide is subject to a process intended to reduce the size of the polysaccharide but to retain a size more than a third, a quarter etc. the size of the native polysaccharide.

Saccharides may also be prepared synthetically or semi-synthetically by methods including chemical synthesis or enzymatic approaches (see, e.g., Berti, 2018).

Carriers

The term "protein carrier" is intended to cover both small peptides and large polypeptides (>10 kDa). The protein carrier may be any suitable peptide or protein comprising one or more T-helper epitopes (Pichichero, 2013).

Suitable carrier proteins include bacterial toxins or toxoids, such as diphtheria toxoid or tetanus toxoid. Fragments of toxins or toxoids can also be used, e.g., fragment C of tetanus toxoid (WO2005000346). One established carrier protein is the non-toxic mutant of *Corynebacterium diphtheriae* protein toxin termed Cross Reacting Material 197 (CRM197 or $CRM_{197}$). CRM197 is well-characterized and is used in saccharide-based conjugate vaccines currently licensed in the US, Europe, and elsewhere (e.g., *Haemophilus influenzae* type b, Meningococcal C and multivalent pneumococcal conjugate vaccines).

Additional suitable carrier proteins include non-toxic mutants of tetanus toxin, and non-toxic mutants of diphtheria toxin (such as CRM176, CRM228, CRM45 (Uchida, 1973); CRM9, CRM102, CRM103, CRM107 and other mutations described by Nicholls and Youle (1992); deletion or mutation of Glu-148 to Asp, Gln or Ser, and/or mutation of Ala-158 to Gly, and other mutations disclosed in U.S. Pat. Nos. 4,709,017 or 4,950,740; mutation of at least one or more residues Lys-516, Lys-526, Phe-530 and/or Lys-534 and other mutations disclosed in U.S. Pat. Nos. 5,917,017 or 6,455,673; or fragments disclosed in U.S. Pat. No. 5,843,711). Additional suitable carrier proteins include GBS surface proteins or fragments thereof, such as the family of alpha-like surface proteins (alp1, alp2, alp3, alp4), the N-terminal domains of the Rib and Alpha C surface proteins, and fusions thereof (see, e.g., WO94/10317; WO94/21685; WO2008127179; WO2017068112; Maeland, 2015; Lindahl, 2007).

Additional suitable carrier proteins are GBS pilus proteins, including the structural pilus backbone protein (BP) and ancillary proteins AP1 and AP2. See, e.g., WO2013124473, WO2011121576, WO2016020413.

Figure 9:
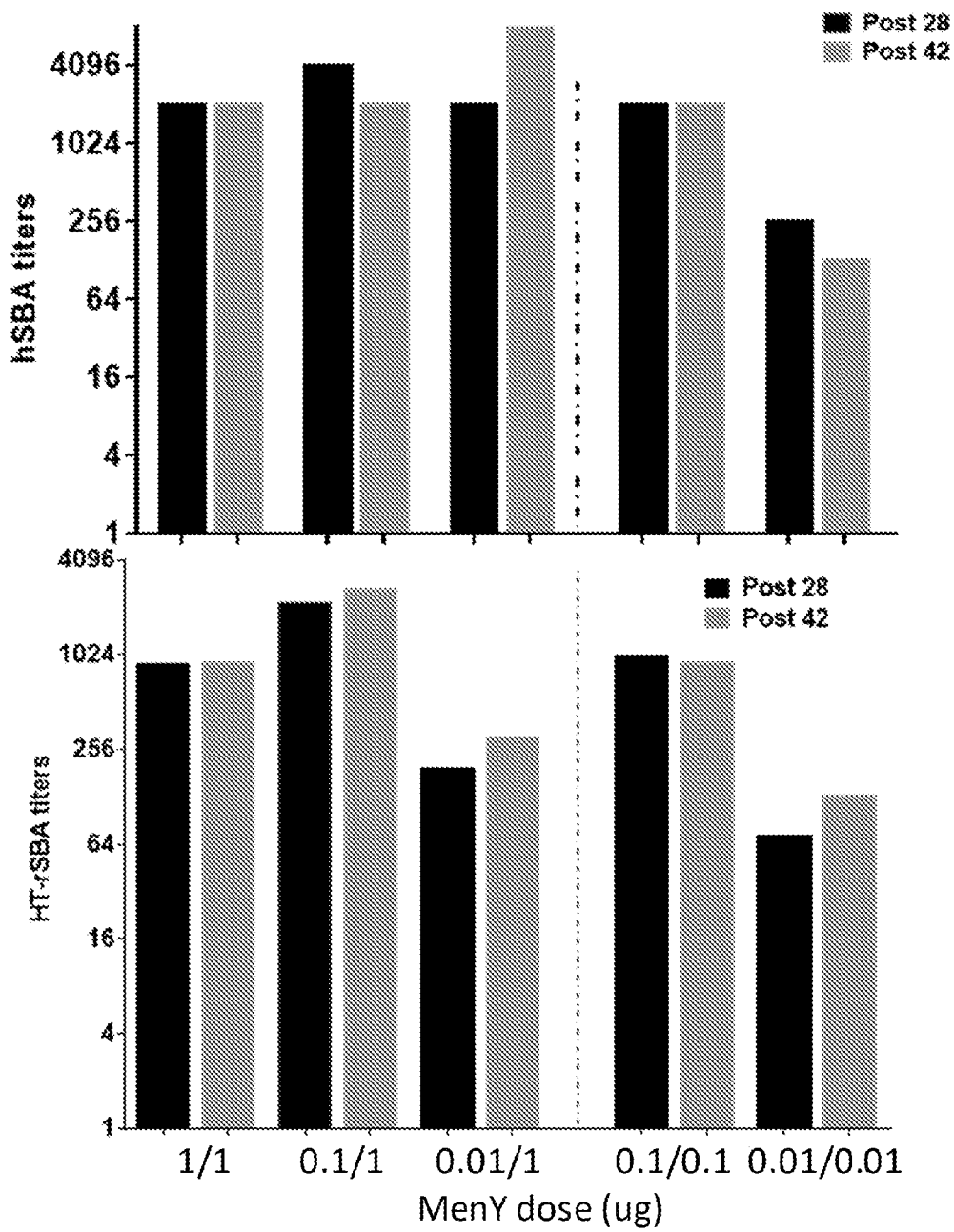
FIG. 9 MenY bactericidal assay results at Day 28 and Day 42 and following administration of multivalent Men glycoconjugate vaccines as described in Example 2: Human bactericidal assay using human plasma as complement source (hSBA)—top panel; baby rabbit complement (HT-rSBA)—bottom panel.

Possible carriers include:

pneumococcal pneumolysin (Kuo, 1995), such as detoxified pneumolysin (dPly), for example pneumolysin which has been detoxified by treatment with formaldehyde;

OMPC (meningococcal outer membrane protein—usually extracted from *N. meningitidis* serogroup B—EP0372501; Donnelly, 1990);

synthetic peptides (EP0378881, EP0427347);

heat shock proteins (WO93/17712, WO94/03208);

pertussis proteins (WO98/58668, EP0471177), cytokines, lymphokines, growth factors or hormones (WO91/01146), artificial proteins comprising multiple human CD4+ T cell epitopes from various pathogen derived antigens (Falugi, 2001) such as N19 protein (Baraldoi, 2004) pneumococcal surface protein PspA (WO02/091998), iron uptake proteins (WO01/72337), toxin A or B of *C. difficile* (WO00/61761);

*H. influenzae* Protein D (EP594610 and WO00/56360), for example, protein D sequence from FIG. 9 (FIGS. 9*a* and 9*b* together, 364 amino acids) of EP0594610. Protein D may be used as a full length protein or as a fragment. For example, Protein D may comprise the protein D fragment described in EP0594610 lacking the 19 N-terminal amino acids from FIG. 9 of EP0594610, optionally with the tripeptide MDP from NS1 fused to the N-terminal of said protein D fragment (348 amino acids) as described in WO2017/067962A1;

pneumococcal PhtA (WO98/18930, also referred to Sp36);

pneumococcal PhtD (disclosed in WO00/37105, and is also referred to Sp036D);

pneumococcal PhtB (disclosed in WO00/37105, and is also referred to Sp036B); and pneumococcal PhtE (disclosed in WO00/30299, and is referred to as BVH-3).

Of particular interest as carriers are:

tetanus toxoid;

diphtheria toxoid;

CRM197;

OMPC; and

*H. influenzae* Protein D.

Conjugation

The saccharide is covalently conjugated to the carrier. Conjugation may be direct or may be indirect through a linker. The saccharide and/or the carrier may be modified to introduce suitable reactive groups which facilitate conjugation.

Conjugation of saccharides to carrier proteins is a known technique (see, e.g., Hermanson, Bioconjugate Techniques (1996)). The saccharide conjugates used in the invention may be prepared by any suitable coupling technique.

In general, the following types of chemical groups on a protein carrier can be used for conjugation:

A) Carboxyl (for instance via aspartic acid or glutamic acid) which may be conjugated to natural or derivatised amino groups on saccharide moieties using carbodiimide chemistry;
B) Amino group (for instance via lysine) which may be conjugated to natural or derivatised carboxyl groups on saccharide moieties using carbodiimide chemistry;
C) Sulphydryl (for instance via cysteine);
D) Hydroxyl group (for instance via tyrosine);
E) Imidazolyl group (for instance via histidine);
F) Guanidyl group (for instance via arginine); and
G) Indolyl group (for instance via tryptophan).

On a saccharide, in general the following groups can be used for a coupling: OH, COOH or $NH_2$. Aldehyde groups can be generated after different treatments known in the art such as: periodate treatment, acid hydrolysis, hydrogen peroxide, etc.

Methods for conjugation are disclosed, for example, in WO2007/000343 and WO2016/178123 which are incorporated herein by reference for the purpose of describing conjugation methods and conjugates which are of use in the implementation of the present invention.

The conjugation method may rely on activation of the saccharide with 1-cyano-4-dimethylamino pyridinium tetrafluoroborate (CDAP) to form a cyanate ester (see WO95/08348 and WO96/29094). The conjugates can also be prepared by direct reductive amination methods as described in U.S. Pat. No. 4,365,170 (Jennings) and U.S. Pat. No. 4,673,574 (Anderson).

Carbodiimide chemistry (e.g. using EDAC) is very convenient for conjugation reactions as it makes use of groups on the saccharide and/or protein which may be naturally present or easily inserted by derivatisation. It also conveniently links moieties through a peptide bond. Carbodiimides (RN=C=NR') are unsaturated compounds with an allene structure (Nakajima, 1995; Hoare, 1967).

Derivatisation may occur through the addition of a hetero- or homo-bifunctional linker. It may take place with similar chemistry as described above for a saccharide-protein conjugation step (e.g. CDAP or carbodiimide chemistry). The linker may have between 4 and 20, 4 and 12, or 5 and 10 carbon atoms. It may have two reactive amino groups, two reactive carboxyl groups, or one of each (e.g. hexane diamine, 6-aminocaproic acid, or adipic acid dihydrazide). Typically derivatization takes place through reacting a large excess of the linker with the saccharide and/or protein carrier to be derivatised. This allows derivatization to take place with minimal intra-moiety cross-linking (which otherwise might be possible if for instance a carboxyl group on a saccharide was being derivatised with amino groups using carbodiimide condensation). Excess linker is readily removed using techniques such as diafiltration.

Carrier protein is typically present in a vaccine dose at a total dose of from 10-100, 20-90, 20-80, 30-70, 35-60 or 40-50 ug.

Compositions may include a small amount of free (unconjugated) carrier molecule. The unconjugated form of the carrier molecule is preferably no more than 5% by weight of the total amount of the carrier protein in the composition as a whole, and is more preferably 2% or less by weight.

Conjugates with a saccharide:protein ratio (w/w) of between 1:5 (i.e. excess protein) and 5:1 (i.e. excess saccharide) are typically used, in particular ratios between 1:5 and 2:1. The ratio of saccharide to carrier protein (w/w) in a conjugate may be determined using the sterilized conjugate. The amount of protein is determined using a Lowry assay (for example Lowry et al. (1951) or Peterson et al. (1979)) and the amount of saccharide may be determined using standard techniques.

In addition to chemical conjugation, Protein Glycan Coupling technology (PGCT), can simplify conjugate manufacturing and has been pioneered for the design of novel glycoconjugate vaccines. Using this approach, both the saccharide antigen and the carrier protein are expressed in host cells, such as *E. coli*, and coupled in vivo. (see e.g., Micoli, 2019).

GBS

The *Streptococcus agalactiae* (Group B *Streptococcus* or GBS) capsule is a major virulence factor that assists the bacterium in evading human innate immune defences. The GBS capsule consists of high molecular weight polymers made of multiple identical repeating units of four to seven monosaccharides. GBS can be classified into ten serotypes (Ia, Ib, II, III, IV, V, VI, VII, VIII and IX) based on the chemical composition and the pattern of glycosidic linkages of the capsular polysaccharide repeating units. Non-typeable strains of GBS are also known to exist. Description of the structure of GBS CPS may be found in the published literature (see e.g., WO2012/035519; Pinto, 2014).

One challenge facing GBS vaccine design is the natural diversity of GBS capsular polysaccharides (CPS). The ten serotypes of GBS have been found to be antigenically unique. There is little or no cross protection between GBS serotypes. It is estimated that 65-95% of global disease-causing isolates are either serotype Ia, Ib or III (Lin, 1998; Davies, 2001). These three serotypes of GBS (Ia, Ib and III) are estimated to cause from 65% to 75% of EOD GBS disease in Europe and the US, and from 80-90% of LOD (see, e.g., Edmond, 2012; Madhi, 2013; Phares, 2008).

Glycoconjugate vaccines for each of GBS serotypes Ia, Ib, II, III, IV and V have separately been shown to be immunogenic in humans. Glycoconjugates of use in the present invention may comprise a GBS capsular saccharide selected from any disease-causing serotype. As prevalence of serotypes varies among geographic regions, vaccine compositions may be designed for specific regions. Vaccines are typically designed to contain GBS CPS antigens from the most prevalent disease-causing serotypes in the geographic area of use.

The present invention may utilize a glycoconjugate comprising a capsular saccharide from a GBS serotype selected from Ia, Ib, II, III, IV, V, VI, VII, VIII or IX. The present invention may utilize a composition comprising a plurality of glycoconjugates of capsular saccharides from two or more GBS serotypes. In one embodiment, the present invention utilizes a glycoconjugate comprising a GBS serotype Ia CPS. In a further embodiment, the present invention utilizes a composition comprising a combination of GBS CPS glycoconjugates selected from: Ia and Ib; Ia and III; Ib and III; Ia, Ib and III; and Ia, Ib, III and V. Thus, the present invention may comprise the use of a monovalent, bivalent, trivalent, quadravalent, pentavalent, hexavalent, septivalent, octovalent, nonavalent or decavalent, compositions. A suitable hexavalent composition comprises GBS CPS glycoconjugates from GBS serotypes Ia, Ib, II, III, IV and V.

GBS capsular saccharides used according to the invention may be in their native form or may have been modified. For example, the saccharide may be shorter than the native capsular saccharide, or may be chemically modified or depolymerized. See e.g., WO2006050341 or Guttormsen, 2008.

Carriers of particular interest for use with GBS polysaccharides are CRM197, DT, TT or GBS proteins (e.g., GBS surface proteins or pilus proteins), especially CRM197, DT or TT, such as CRM197.

Conjugation of GBS CPS to carrier proteins has been described (see, e.g., WO2012035519).

A standard human dose of a GBS glycoconjugate is typically 5 ug. In a multivalent vaccine comprising a plurality of GBS serotype glycoconjugates, a standard human dose is typically 5 ug of each serotype glycoconjugate. For a trivalent GBS conjugate vaccine with TT, DT or CRM197 as carrier protein, in conjunction with 5 ug of each saccharide, a total carrier protein dose of 20-80 ug is contemplated.

Hib

*Haemophilus influenzae* is a gram-negative coccobacillus. Most strains of *H. influenzae* that cause invasive disease are type b. *H. influenzae* type b can cause invasive disease such as sepsis and meningitis. Specific levels of antibodies to polyribosyl-ribitol-phosphate (anti-PRP) have been shown to correlate with protection against invasive disease due to *H. influenzae* type b. Hib PRP saccharides are therefore of interest.

Carriers of particular interest for use with Hib PRP are CRM197, DT, TT and OMPC, especially TT.

Conjugation of Hib to carrier proteins has been described (see, e.g., WO2007000343).

A standard human dose of a Hib glycoconjugate is typically 10 ug of saccharide. A carrier protein dose of 10-40 ug is contemplated.

Men A

Meningococcal serogroup A capsular saccharide may be obtained by methods such as those described in WO03/007985, WO2007000343 or WO2018045286. A MenA capsular saccharide used for conjugation may be the full-length native sequence or may be reduced in size.

Native saccharides may be partially hydrolysed to reduce the degree of polymerization (DP), for example to approximately 10, as determined by the (w/w) ratio between the total organic phosphorus and the monoester phosphate. The DP ratio of (total organic phosphorus) to (phosphorus monoester) is inversely proportional to optical rotatory power (a), this relationship can be used to monitor the extent of hydrolysis more conveniently than direct phosphorus measurements.

Sizing may be applied to remove low and/or high molecular weight saccharides. For example, hydrolysate may be filtered (e.g., diafiltration or ultrafiltration) through a high cut-off membrane, such as 30 kDa, with retentate discarded to remove high molecular weight saccharides. Low molecular weight saccharides, such as those with DP<6, may be removed by means such column chromatography, e.g. a Q Sepharose Fast Flow column, to provide oligosaccharide with an average DP of about 15. Low molecular weight saccharides, such as those with DP<6, may alternatively be removed by filtration (e.g., diafiltration or ultrafiltration) through a low cut-off membrane, with filtrate discarded.

Oligosaccharides may be modified to facilitate conjugation through the introduction of a primary amino group at the reducing terminus, such as through the use of sodium cyanoborohydride. Derivatized oligosaccharide may then be coupled to a carrier using conjugation chemistry such as using adipic acid N-hydroxysuccinimido diester.

Carriers of particular interest for use with MenA are CRM197, DT and TT, especially CRM197.

Conjugation of MenA to carrier proteins has been described (see, e.g., WO03/007985 and WO2007000343).

A standard human dose of a MenA glycoconjugate is typically 10 ug of saccharide. A carrier protein dose of 5-40 ug is contemplated.

Men C

Meningococcal serogroup C capsular saccharide may be obtained by methods such as those described in: Constantino, 1999; WO2007000343 or WO2018045286.

Native saccharides may be partially hydrolysed to reduce the degree of polymerization (DP), for example to approximately 10. The avDP of Men C oligosaccharides was determined after de-O-acetylation and periodate treatment. The avDP is expressed as the molar ratio between total sialic acid and formaldehyde generated by periodate treatment.

Sizing may be applied to remove low and/or high molecular weight saccharides. For example, hydrolysate may be filtered (e.g., diafiltration or ultrafiltration) through a high cut-off membrane, such as 30 kDa, with retentate discarded to remove high molecular weight saccharides. Low molecular weight saccharides, such as those with DP≤6, may be removed by means such column chromatography, e.g. a Q Sepharose Fast Flow column, to provide oligosaccharide with an average DP of about 15. Low molecular weight saccharides, such as those with DP≤6, may alternatively be removed by filtration (e.g., diafiltration or ultrafiltration) through a low cut-off membrane, with filtrate discarded.

Oligosaccharides may be modified to facilitate conjugation through the introduction of a primary amino group at the reducing terminus, such as through the use of sodium cyanoborohydride. Derivatized oligosaccharide may then be coupled to a carrier using conjugation chemistry such as using adipic acid N-hydroxysuccinimido diester.

Carriers of particular interest for use with MenC are CRM197, DT and TT, especially CRM197.

Conjugation of MenC to carrier proteins has been described (see, e.g., WO2007000343).

A standard human dose of a MenC glycoconjugate is typically 5 ug of saccharide. A carrier protein dose of 5-20 ug is contemplated.

Men W

Meningococcal serogroup W capsular saccharide may be obtained by methods such as those described in WO03/007985 or WO2018045286.

Native saccharides may be partially hydrolysed to reduce the degree of polymerization (DP), for example to about 15 to 20, as determined by the ratio between sialic acid (SA) and reduced terminal SA. The DP ratio of (total SA) to (reduced terminal SA) is related to the KD as determined by HPLC-SEC. This relationship can be used to monitor the extent of hydrolysis more conveniently than direct SA measurements.

Sizing may be applied to remove low and/or high molecular weight saccharides. For example, hydrolysate may be filtered (e.g., diafiltration or ultrafiltration) through a high cut-off membrane, such as 30 kDa, with retentate discarded to remove high molecular weight saccharides. Low molecular weight saccharides, such as those with DP≤3-4, may be removed by means such column chromatography, e.g. a Q Sepharose Fast Flow column. Low molecular weight saccharides, such as those with DP≤3-4, may alternatively be removed by filtration (e.g., diafiltration or ultrafiltration) through a low cut-off membrane, with filtrate discarded.

Oligosaccharides may be modified to facilitate conjugation through the introduction of a primary amino group at the reducing terminus, such as through the use of sodium cyanoborohydride. Derivatized oligosaccharide may then be coupled to a carrier using conjugation chemistry such as using adipic acid N-hydroxysuccinimido diester.

Carriers of particular interest for use with MenW are CRM197, DT and TT, especially CRM197.

Conjugation of MenW to carrier proteins has been described (see, e.g., WO03/007985 and WO2007000343).

A standard human dose of a MenW glycoconjugate is typically 5 ug of saccharide. A carrier protein dose of 5-20 ug is contemplated.

Men Y

Meningococcal serogroup Y capsular saccharide may be obtained by methods such as those described in WO03/007985 or WO2018045286.

Native saccharides may be partially hydrolysed to reduce the degree of polymerization (DP), for example to about 15 to 20, as determined by the ratio between sialic acid (SA) and reduced terminal SA. The DP ratio of (total SA) to (reduced terminal SA) is related to the KD as determined by HPLC-SEC. This relationship can be used to monitor the extent of hydrolysis more conveniently than direct SA measurements.

Sizing may be applied to remove low and/or high molecular weight saccharides. For example, hydrolysate may be filtered (e.g., diafiltration or ultrafiltration) through a high cut-off membrane, such as 30 kDa, with retentate discarded to remove high molecular weight saccharides. Low molecular weight saccharides, such as those with DP≤3-4, may be removed by means such column chromatography, e.g. a Q Sepharose Fast Flow column. Low molecular weight saccharides, such as those with DP≤3-4, may alternatively be removed by filtration (e.g., diafiltration or ultrafiltration) through a low cut-off membrane, with filtrate discarded.

Oligosaccharides may be modified to facilitate conjugation through the introduction of a primary amino group at the reducing terminus, such as through the use of sodium cyanoborohydride. Derivatized oligosaccharide may then be coupled to a carrier using conjugation chemistry such as using adipic acid N-hydroxysuccinimido diester.

Carriers of particular interest for use with MenY are CRM197, DT and TT, especially CRM197.

Conjugation of MenY to carrier proteins has been described (see, e.g., WO03/007985 and WO2007000343).

A standard human dose of a MenY glycoconjugate is typically 5 ug of saccharide. A carrier protein dose of 5-20 ug is contemplated.

Men X

The structure of the MenX capsular polysaccharide is known and conjugation of MenX saccharides to carriers has been described (see, e.g., WO2013174832).

Carriers of particular interest for use with MenX are CRM197, DT, protein D and TT, especially CRM197.

Conjugation of MenX to carrier proteins has been described (see, e.g., WO2013174832).

A standard human dose of a MenX glycoconjugate is typically 5 ug of saccharide. A carrier protein dose of 5-20 ug is contemplated.

PCV

Pneumococcus (*Streptococcus pneumoniae*) is encapsulated with a chemically linked polysaccharide which confers serotype specificity. There are more than 90 known serotypes of pneumococci, and the capsule is the principle virulence determinant for pneumococci, as the capsule not only protects the inner surface of the bacteria from complement, but is itself poorly immunogenic. An anti-polysaccharide antibody level has been regarded as predictive of the protection against invasive pneumcoccal disease (Jodar, 2003). After initial licensure of a 7-valent conjugate vaccine containing serotypes 4, 6B, 9V, 14, 18C, 19F, 23F (PCV7), two pneumococcal conjugate vaccines (PCVs) designed to broaden coverage have been licensed. The 10-valent pneumococcal *Haemophilus influenzae* protein D conjugate vaccine (PCV10) contains serotypes 1, 4, 5, 6B, 7F, 9V, 14 and 23F conjugated to nontypeable *H. influenzae* protein D, plus serotype 18C conjugated to tetanus toxoid and serotype 19F conjugated to diphtheria toxoid. The 13-valent pneumococcal conjugate vaccine (PCV13) contains the PCV7 (4, 6B, 9V, 14, 18C, 19F, 23F) serotypes plus serotypes 1, 3, 5, 6A, 7F and 19A, conjugated to cross-reactive material CRM197.

Pneumococcus saccharides will typically be selected from the following serotypes 1, 2, 3, 4, 5, 6A, 6B, 7F, 8, 9N, 9V, 10A, 11A, 12F, 14, 15B, 15C, 17F, 18C, 19A, 19F, 20, 22F, 23F and 33F, although it is appreciated that one or two other serotypes could be substituted depending on the age of the recipient receiving the vaccine and the geographical location where the vaccine will be administered. Typically compositions will comprise glycoconjugates wherein the polysaccharides are derived from at least ten serotypes of *S. pneumoniae*. The composition may comprise Pneumococcus glycoconjugates comprising (or consisting essentially of) glycoconjugates wherein the polysaccharides are derived from *S. pneumoniae* serotypes 1, 4, 5, 6B, 7F, 9V, 14, 18C, 19F and 23F. The composition may comprise Pneumococcus glycoconjugates comprising (or consisting essentially of) glycoconjugates wherein the polysaccharides are derived from *S. pneumoniae* serotypes 1, 3, 4, 5, 6A, 6B, 7F, 9V, 14, 18C, 19A, 19F and 23F. The composition may comprise Pneumococcus glycoconjugates comprising (or consisting essentially of) glycoconjugates wherein the polysaccharides are derived from *S. pneumoniae* serotypes 1, 3, 4, 5, 6B, 7F, 9V, 14, 18C, 19A, 19F, 22F, 23F and 33F. The composition may comprise Pneumococcus glycoconjugates comprising (or consisting essentially of) glycoconjugates wherein the polysaccharides are derived from *S. pneumoniae* serotypes 1, 3, 4, 5, 6A, 6B, 7F, 9V, 14, 18C, 19A, 19F, 22F, 23F and 33F. The composition may comprise Pneumococcus glycoconjugates comprising (or consisting essentially of) glycoconjugates wherein the polysaccharides are derived from *S. pneumoniae* serotypes 1, 3, 4, 5, 6A, 6B, 7F, 9V, 12F, 14, 18C, 19A, 19F, 22F, 23F and 33F. The composition may comprise Pneumococcus glycoconjugates comprising (or consisting essentially of) glycoconjugates wherein the polysaccharides are derived from *S. pneumoniae* serotypes 1, 3, 4, 5, 6A, 6B, 7F, 8, 9V, 10A, 11A, 12F, 14, 15B, 18C, 19A, 19F, 22F, 23F and 33F.

Carriers of particular interest for use with Pneumococcus saccharides are CRM197, DT, protein D and TT.

A standard human dose of a Pneumococcus glycoconjugate is 1 ug of saccharide for serotype 1, 5, 6B, 7F, 9V, 14 and 23F and 3 ug of saccharide for serotype 4, 18C and 19F.

*Salmonella typhi*

A *Salmonella typhi* vaccine conjugate based on Vi from purified *Citrobacter freundii* sensu lato and $CRM_{197}$ protein carrier has been described by Micoli, 2012 and Rondini, 2012. When tested in humans, Vi-$CRM_{197}$ conjugate vaccine provided higher anti-Vi antibody responses compared to unconjugated Vi after a single immunisation and at a lower dose (van Damme, 2011; further results presented at the 8th International Conference on Typhoid Fever and Other Invasive Salmonelloses, Bangladesh, March 2013). However, the anti-Vi response following revaccination was lower than the primary response and anti-Vi persistence was shorter than desired (Bhutta, 2014).

The repeating unit of Vi polysaccharide is:

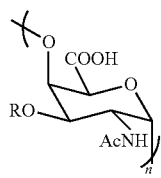

wherein R is H or acetyl.

Improved conjugates have been described, see WO2015068129, which utilize fragmented Vi polysaccharide having average molecular weight of between 40 and 55 kDa.

Polysaccharides with at least 60% 0-acetylation are preferred.

Carriers of particular interest for use with *Salmonella* Vi polysaccharides are CRM197, DT and TT, especially CRM197.

Conjugation of Vi saccharides to carrier proteins has been described (see, e.g., WO2007000343, WO2009150543, WO2013038375 and WO2015068129).

A standard human dose of a Vi glycoconjugate is typically 25 ug, a total carrier protein dose of 10-50 ug is contemplated.

Multivalent Approaches

Conveniently, a multivalent vaccine may be used which is directed to a plurality of pathogens and/or a plurality of pathogen subtypes (e.g., serotypes etc). In such cases each carrier protein molecule may be conjugated to only one type of saccharide. However, a carrier protein may be conjugated to more than one molecule of a particular saccharide. Conjugation of only one type of saccharide to a carrier simplifies and thereby provides greater control over the conjugation process.

Use of more than one carrier protein within a vaccine composition is known, e.g., to reduce the risk of carrier suppression. Thus, different carrier proteins can be used for different types of saccharide. It is also possible to use more than one carrier protein for a particular type of saccharide, e.g. a type of saccharide might be in two groups, with some conjugated to CRM197 and others conjugated to tetanus toxoid.

Multivalent approaches of particular interest include combinations of glycoconjugates:

*N. meningitidis* glycoconjugates, such as combinations comprising (or consisting essentially of) MenA, MenC, MenW and MenY glycoconjugates, particularly with CRM197, DT and/or TT carriers;

Pneumococcus glycoconjugates, such as combinations comprising (or consisting essentially of) serotype 1, 4, 5, 6B, 7F, 9V, 14, 18C, 19F and 23F glycoconjugates, particularly with CRM197, DT, protein D and/or TT carriers; and GBS glycoconjugates, such as combinations comprising (or consisting essentially of) serotypes Ia, Ib and III glycoconjugates, especially serotype Ia, Ib, II, III, IV and V glycoconjugates, particularly with CRM197, DT and/or TT carriers.

Where a composition comprises multiple glycoconjugates, the amount of each glycoconjugate is treated independently.

Multivalent approaches will conveniently, where co-formulation is possible, involve the administration of a single composition containing a plurality of glycoconjugate components. However, it will be appreciated that a multivalent approach may alternatively involve the essentially contemporaneous administration of a plurality of compositions via the same or different routes.

Adjuvants

An "adjuvant" is an agent that enhances the production of an immune response in a non-antigen specific manner. When utilised in conjunction with an antigen, an adjuvant may enable the induction stronger or otherwise improved immune responses to the antigen.

In some embodiments of the invention, the first dose is unadjuvanted. In other embodiments of the invention, the first dose is adjuvanted.

In some embodiments of the invention, the second dose is unadjuvanted. In other embodiments of the invention, the second dose is adjuvanted.

When the first and second doses are adjuvanted, suitably the adjuvant is the same.

Adjuvant, when present, will normally be present in an amount sufficient to enhance the recipient's immune response to the glycoconjugate (compared to the response obtained without adjuvant).

Examples of adjuvants include but are not limited to inorganic adjuvants (e.g., inorganic metal salts such as aluminium phosphate or aluminium hydroxide), organic adjuvants (e.g., saponins, such as QS21, or squalene), oil-based adjuvants (e.g., Freund's complete adjuvant and Freund's incomplete adjuvant), cytokines (e.g., IL-1β, IL-2, IL-7, IL-12, IL-18, GM-CFS, and INF-γ) particulate adjuvants (e.g., immuno-stimulatory complexes (ISCOMS), liposomes, or biodegradable microspheres), virosomes, bacterial adjuvants (e.g., monophosphoryl lipid A, such as 3-de-O-acylated monophosphoryl lipid A (3D-MPL), or muramyl peptides), synthetic adjuvants (e.g., non-ionic block copolymers, muramyl peptide analogues, or synthetic lipid A), synthetic polynucleotides adjuvants (e.g. polyarginine or polylysine) and immunostimulatory oligonucleotides containing unmethylated CpG dinucleotides ("CpG"). Particularly suitable adjuvants are selected from one or more of a saponin, a TLR4 agonist (e.g., 3D-MPL, a GLA or CRX601), a TLR7 agonist, a TLR8 agonist, a TLR9 agonist.

Suitable adjuvants include mineral salts such as an aluminium or calcium salts (or mixtures thereof). The aluminium salts known as aluminum hydroxide and aluminum phosphate may be used. These names are conventional, but are used for convenience only, as neither is a precise description of the actual chemical compound which is present. The invention can use any of the "hydroxide" or "phosphate" adjuvants that are in general use as adjuvants. The adjuvants known as "aluminium hydroxide" ('alum') are typically aluminium oxyhydroxide salts. The adjuvants known as "aluminium phosphate" are typically aluminium hydroxyphosphates, often also containing a small amount of sulfate (i.e., aluminium hydroxyphosphate sulfate).

Other possible adjuvants include saponins. Quil A and its derivatives. Quil A is a saponin preparation isolated from the South American tree Quillaja *saponaria* Molina and was first described as having adjuvant activity by Dalsgaard et al. in 1974 ("Saponin adjuvants", Archiv. für die gesamte Virusforschung, Vol. 44, Springer Verlag, Berlin, p 243-254). Purified fractions of Quil A have been isolated by HPLC which retain adjuvant activity without the toxicity associated with Quil A (see, for example, EP0362278). Fractions of general interest include QS7, QS17, QS18 and QS21, for example QS7 and QS21 (also known as QA7 and QA21). QS21 is a saponin of particular interest.

In certain embodiments of the present invention, the saponin is a derivative of Quillaja *saponaria* Molina quil A, suitably an immunologically active fraction of Quil A, such as QS7, QS17, QS18 or QS21, in particular QS21.

Typically the saponin, such as Quil A and in particular QS21, is at least 90% pure, such as at least 95% pure, especially at least 98% pure, in particular 99% pure.

Purity of QS21 components may be determined by UV absorbance at 214 nm as the proportion (e.g., at least 95%, especially at least 98%, in particular 99%) of QS21 components in the saponin used. A beneficial feature of the present invention is that the saponin may be presented in a less reactogenic composition where it is quenched with an exogenous sterol, such as cholesterol. In particular, QS21 may be formulated with cholesterol-based liposomes as a delivery platform. QS21 which is quenched with cholesterol shows equivalent immunostimulating properties to free QS21 but is less lytic and more stable.

TLR4 agonists are of particular interest as adjuvants. A suitable example of a TLR4 agonist is a lipopolysaccharide, suitably a non-toxic derivative of lipid A, particularly a monophosphoryl lipid A and more particularly 3-de-O-acylated monophosphoryl lipid A (3D-MPL).

Other TLR4 agonists which can be used are aminoalkyl glucosaminide phosphates (AGPs) such as those described in WO98/50399 or U.S. Pat. No. 6,303,347 (processes for preparation of AGPs are also described). Some AGPs are TLR4 agonists, and some are TLR4 antagonists. A particular AGP of interest is CRX601:

Other TLR4 agonists which may be of use in the present invention include Glucopyranosyl Lipid Adjuvants (GLA) such as described in WO2008/153541, WO2009/143457 and 9,241,988 or the literature articles Coler (2011) and Arias M A (2012). WO2008/153541, WO2009/143457 and U.S. Pat. No. 9,241,988 are incorporated herein by reference for the purpose of defining TLR4 agonists which may be of use in the present invention.

Typically the TLR4 agonist, such as the lipopolysaccharide and in particular 3D-MPL, is at least 90% pure, such as at least 95% pure, especially at least 98% pure, in particular 99% pure.

TLR7 and/or TLR8 agonists may be of used in the present invention (see, e.g., Dowling 2018). Particular TLR7 and/or TLR8 agonists of interest include:

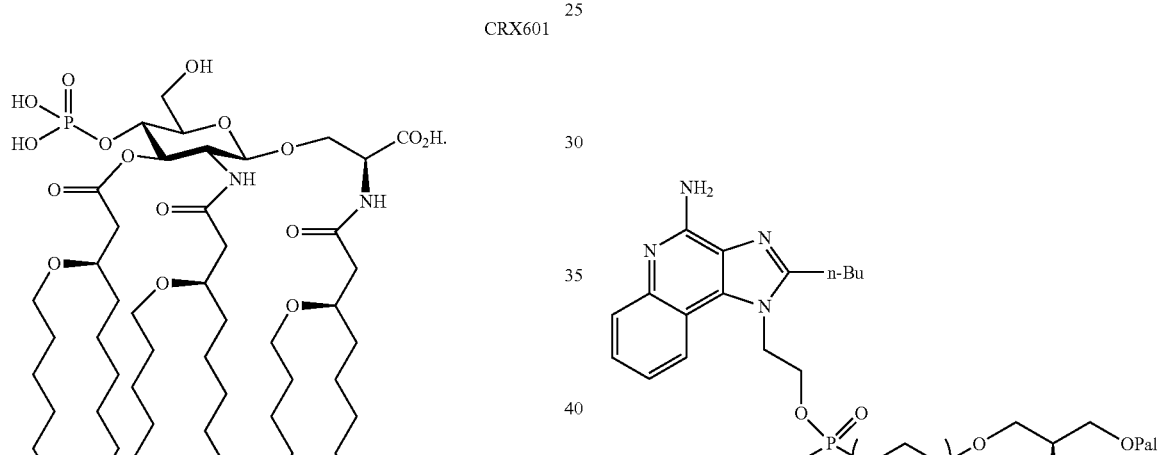

CRX601

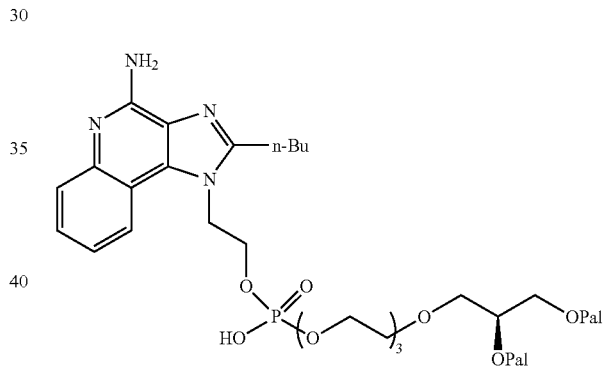

4-amino-1-[2-(1,2-dipalmitoyl-sn-glycero-3 triethyleneglycol-phospho)ethyl]-2-n-butyl-1H-imidazo[4,5-c]quinoline; or

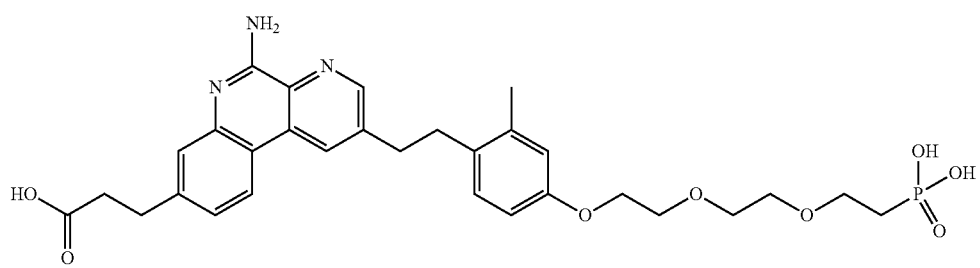 [SMILES: Cc1cc(OCCOCCOCCP(=O)(O)O)ccc1CCc1cnc2c(N)nc3cc(CCC(=O)O)ccc3c2c1]

(3-(5-amino-2-(2-methyl-4-(2-(2-(2-phosphonoethoxy)ethoxy)ethoxy)phenethyl) benzo[f][1,7]naphthyridin-8-yl)propanoic acid.

Another adjuvant is an immunostimulatory oligonucleotide containing unmethylated CpG dinucleotides ("CpG") (Krieg, 1995). CpG is an abbreviation for cytosine-guanosine dinucleotide motifs present in DNA. CpG is known as an adjuvant when administered by both systemic and mucosal routes (WO 96/02555, EP 468520, Davis, 1998; McCluskie, 1998). CpG, when formulated into vaccines, may be administered in free solution together with free antigen (WO 96/02555) or covalently conjugated to an antigen (WO 98/16247), or formulated with a carrier such as aluminium hydroxide (Brazolot-Millan, 1998).

In some embodiments, the adjuvant includes an oil and water emulsion, in particular a squalene containing submicron oil-in-water emulsion. One example of an oil-in-water emulsion comprises a metabolisable oil, such as squalene, a tocol such as a tocopherol, e.g., alpha-tocopherol, and a surfactant, such as sorbitan trioleate (e.g., SPAN85 or polyoxyethylene sorbitan monooleate (e.g., TWEEN 80), in an aqueous diluent. An example of an oil-in-water emulsion is MF59, which is an oil-in-water emulsion comprising squalene.

Suitably the adjuvant is in an emulsion formulation, a liposomal formulation or an ISCOM formulation.

Combinations of adjuvants is possible.

Particular adjuvants of interest in the present invention include:
- aluminium salts, such as aluminium hydroxide or aluminium phosphate;
- a combination of an aluminium salt, such as aluminium hydroxide or aluminium phosphate, and a TLR4 agonist, such as a lipopolysaccharide, in particular 3D-MPL, CRX601 or a GLA, especially 3D-MPL;
- oil in water emulsion adjuvants, such as squalene based emulsions, suitably with alpha-tocopherol;
- a combination of a saponin, such as QS21, and a TLR4 agonist, such as a lipopolysaccharide, in particular 3D-MPL, CRX601 or a GLA, especially 3D-MPL. A combination of a saponin and a TLR4 agonist may be presented in an oil in water emulsion, though is suitably presented in a liposomal formulation;
- a combination of an aluminium salt, such as aluminium hydroxide or aluminium phosphate, and a TLR7 and/or TLR8 agonist, such as 4-amino-1-[2-(1,2-dipalmitoyl-sn-glycero-3 triethyleneglycol-phospho)ethyl]-2-n-butyl-1H-imidazo[4,5-c]quinoline or (3-(5-amino-2-(2-methyl-4-(2-(2-(2-phosphonoethoxy)ethoxy)ethoxy)phenethyl) benzo[f][1,7]naphthyridin-8-yl)propanoic acid;
- a combination of a TLR4 agonist, such as a lipopolysaccharide, in particular 3D-MPL, CRX601 or a GLA, especially 3D-MPL and a TLR7 and/or TLR8 agonist, such as 4-amino-1-[2-(1,2-dipalmitoyl-sn-glycero-3 triethyleneglycol-phospho)ethyl]-2-n-butyl-1H-imidazo[4,5-c]quinoline or (3-(5-amino-2-(2-methyl-4-(2-(2-(2-phosphonoethoxy)ethoxy)ethoxy)phenethyl) benzo[f][1,7]naphthyridin-8-yl)propanoic acid.

Subject

The methods and immunogenic compositions provided herein may be used to raise an immune response in a subject in need thereof, in particular a mammalian subject. The mammal may be a domestic animal such as a dog or cat, or may be a farm animal such as a cow, pig, sheep or chicken. Suitably, the subject is a human.

The human may be a human child. For example, at the time of administration of the first dose, a human subject may be less than 1 year old. Suitably at the time of administration of the first dose a human subject is at least 4 weeks old. Alternatively, human subject may be 1 to 5 years old at the time of administration of the first dose or 5 to 18 years old at the time of administration of the first dose.

The human may be a human adult. For example, at the time of administration of the first dose, a human subject may be 18 to 60 years old, such as 18 to 40 years old.

The human may be an elderly adult. For example, at the time of administration of the first dose, a human subject may be greater than 60 years old, such as greater than 65 years old.

In some embodiments, the subject has not previously been vaccinated with a glycoconjugate vaccine against the applicable pathogen (e.g., virus, fungus or bacteria against which the immune response elicited by the methods of the invention is intended to provide protection), such as the subject has not previously been vaccinated against the applicable pathogen. In other embodiments, the subject has previously been vaccinated against the against the applicable pathogen, such as vaccinated with a glycoconjugate.

In some embodiments, the subject has not previously been vaccinated against the bacterium. In other embodiments, the subject has previously been vaccinated against the bacterium.

Timing of Administration

The second dose will typically be administered to a subject 1 week to 12 months after the first dose, such as 2 weeks to 9 months after the first dose, especially 3 weeks to 6 months after the first dose, in particular 3 weeks to 3 months after the first dose and desirably 3 weeks to 2 months after the first dose. For example, the second dose may be administered to a subject 2, 3, 4, 5, 6, 7, 8, 9 or 10 weeks after the first dose. The second dose may be administered to a subject 2, 3, 4, 5 or 6 months after the first dose. Suitably the second dose may be administered 3 to 5 weeks after the first dose.

Further administrations, such as a third or fourth administration of glycoconjugate may be given.

The second dose will typically be administered to a human subject 3 weeks to 12 months after the first dose, such as 3 weeks to 9 months after the first dose, especially 3 weeks to 6 months after the first dose, in particular 3 weeks to 3 months after the first dose and desirably 3 weeks to 2 months after the first dose. For example, the second dose may be administered to a human subject 3, 4, 5, 6, 7, 8, 9 or 10 weeks after the first dose. The second dose may be administered to a human subject 3, 4, 5 or 6 months after the first dose. Suitably the second dose may be administered 3 to 5 weeks after the first dose.

Further administrations, such as a third or fourth administration of glycoconjugate may be given to a human subject.

In some embodiments where a human subject receives a first, second and third dose, the third dose is at least 10 months after the first dose, such as at least 12 months, especially at least 24 months and in particular at least 36 months after the first dose. In other embodiments where a human subject receives a first, second and third dose, the third dose is within 36 months after the first dose, such as within 24 months after the first dose, especially within 12 months after the first dose.

Route of Administration

Administration as described herein is carried out via any suitable route, including intradermally, intramuscularly, intraperitoneally or subcutaneously, especially intramuscularly or subcutaneously, in particular intramuscularly.

Injection may be via a needle (e.g., a hypodermic needle), but needle-free injection may alternatively be used.

Each dose may be given through the same or different routes, typically the same route and especially intramuscularly.

Doses

Suitably the amount of glycoconjugate in the first dose is $\frac{1}{5}$ to $\frac{1}{500}$ of the amount of glycoconjugate in the second dose. For example, the first dose is $\frac{1}{100}$ to $\frac{1}{500}$ of the amount of glycoconjugate in the second dose. Alternatively, the first dose is $\frac{1}{25}$ to $\frac{1}{100}$ of the amount of glycoconjugate in the second dose. The first dose may be $\frac{1}{5}$ to $\frac{1}{25}$ of the amount of glycoconjugate in the second dose, such as $\frac{1}{8}$ to $\frac{1}{25}$ or $\frac{1}{10}$ to $\frac{1}{25}$. Of particular interest are embodiments where the amount of glycoconjugate in the first dose is $\frac{1}{10}$ or $\frac{1}{50}$ of the amount of glycoconjugate in the second dose.

Suitably the first dose is $\frac{1}{20}$ to $\frac{1}{5000}$ of the amount of glycoconjugate in the second dose. For example, the first dose is $\frac{1}{1000}$ to $\frac{1}{5000}$ of the amount of glycoconjugate in the second dose. Alternatively, the first dose is $\frac{1}{100}$ to $\frac{1}{1000}$ of the amount of glycoconjugate in the second dose. The first dose may be $\frac{1}{20}$ to $\frac{1}{100}$ of the amount of glycoconjugate in the second dose.

Suitably the first dose comprises 0.005 to 2 ug of glycoconjugate. For example, the amount of glycoconjugate in the first dose is 0.005 to 0.05 ug. Alternatively, the amount of glycoconjugate in the first dose is 0.05 to 0.3 ug. The amount of glycoconjugate in the first dose may be 0.3 to 1 ug. Of particular interest are embodiments where the amount of glycoconjugate in the first dose is 0.1 to 2 ug, especially 0.3 to 1.5 ug, in particular 0.5 to 1 ug. Also of interest are embodiments where the amount of glycoconjugate in the first dose is 0.01 to 0.5 ug, especially 0.05 to 0.3 ug, in particular 0.1 to 0.2 ug. Of particular interest are embodiments where the amount of glycoconjugate in the first dose is 0.5 ug, 1 ug, 0.1 ug or 0.2 ug.

Suitably the first dose comprises 0.0005 to 0.5 ug of glycoconjugate. For example, the amount of glycoconjugate in the first dose is 0.0005 to 0.005 ug. Alternatively, the amount of glycoconjugate in the first dose is 0.005 to 0.05 ug. The amount of glycoconjugate in the first dose may be 0.05 to 0.5 ug.

In some embodiments, the second dose suitably comprises 1 to 30 ug of glycoconjugate. For example, the amount of glycoconjugate in the second dose is 1 to 15 ug. Alternatively, the amount of glycoconjugate in the second dose is 15 to 30 ug. The amount of glycoconjugate in the second dose may be 5 to 25 ug.

When the amount of glycoconjugate in the second dose is at least twice the amount of glycoconjugate in the first dose, suitably the amount of glycoconjugate in the second dose is at least five times the amount of glycoconjugate in the first dose, such as 5 to 25 times (e.g., 10 times) or 25 to 100 times (e.g., 50 times) the amount of glycoconjugate in the first dose.

In some embodiments, suitably the amount of glycoconjugate in the first dose is $\frac{1}{5}$ to $\frac{1}{500}$ of a standard dose of glycoconjugate. For example, the first dose is $\frac{1}{100}$ to $\frac{1}{500}$ of a standard dose of glycoconjugate. Alternatively, the first dose is $\frac{1}{25}$ to $\frac{1}{100}$ of a standard dose of glycoconjugate. The first dose may be $\frac{1}{5}$ to $\frac{1}{25}$ of a standard dose of glycoconjugate, such as $\frac{1}{8}$ to $\frac{1}{25}$, in particular $\frac{1}{10}$ to $\frac{1}{25}$. Of particular interest are embodiments where the amount of glycoconjugate in the first dose is $\frac{1}{10}$ or $\frac{1}{50}$ of a standard dose of glycoconjugate.

In other embodiments, suitably the amount of glycoconjugate in the first dose is $\frac{1}{10}$ to $\frac{1}{2000}$ of a standard dose of glycoconjugate. For example, the first dose is $\frac{1}{500}$ to $\frac{1}{2000}$ of a standard dose of glycoconjugate. Alternatively, the first dose is $\frac{1}{50}$ to $\frac{1}{500}$ of a standard dose of glycoconjugate. The first dose may be $\frac{1}{10}$ to $\frac{1}{50}$ of a standard dose of glycoconjugate.

Suitably the amount of glycoconjugate in the second dose is $\frac{1}{2}$ to 2-fold of a standard dose of glycoconjugate. For example, the amount of glycoconjugate in the second dose is $\frac{1}{2}$ to a standard dose of glycoconjugate. Alternatively, the amount of glycoconjugate in the second dose is a standard dose to 2-fold of a standard dose of glycoconjugate. The amount of glycoconjugate in the second dose may be $\frac{3}{4}$ to 1.25-fold of a standard dose of glycoconjugate.

In other embodiments, suitably the second dose comprises 0.005 to 2 ug of glycoconjugate. For example, the amount of glycoconjugate in the second dose is 0.005 to 0.05 ug.

Alternatively, the amount of glycoconjugate in the second dose is 0.05 to 0.3 ug. The amount of glycoconjugate in the second dose may be 0.3 to 1 ug. Of particular interest are embodiments where the amount of glycoconjugate in the second dose is 0.1 to 2 ug, especially 0.3 to 1.5 ug, in particular 0.5 to 1 ug. Also of interest are embodiments where the amount of glycoconjugate in the second dose is 0.01 to 0.5 ug, especially 0.05 to 0.3 ug, in particular 0.1 to 0.2 ug. Of particular interest are embodiments where the amount of glycoconjugate in the second dose is 0.5 ug, 1 ug, 0.1 ug or 0.2 ug.

In some embodiments, suitably the amount of glycoconjugate in the second dose is $\frac{1}{5}$ to $\frac{1}{500}$ of a standard dose of glycoconjugate. For example, the second dose is $\frac{1}{100}$ to $\frac{1}{500}$ of a standard dose of glycoconjugate. Alternatively, the second dose is $\frac{1}{25}$ to $\frac{1}{100}$ of a standard dose of glycoconjugate. The second dose may be $\frac{1}{5}$ to $\frac{1}{25}$ of a standard dose of glycoconjugate, such as $\frac{1}{8}$ to $\frac{1}{25}$, in particular $\frac{1}{10}$ to $\frac{1}{25}$. Of particular interest are embodiments where the amount of glycoconjugate in the second dose is $\frac{1}{10}$ or $\frac{1}{50}$ of a standard dose of glycoconjugate.

When the amount of glycoconjugate in the second dose is $\frac{1}{2}$ to 5-fold the amount of glycoconjugate in the first dose, suitably the amount of glycoconjugate in the second dose is $\frac{1}{2}$ to 2-fold of the amount of glycoconjugate in the first dose. The amount of glycoconjugate in the second dose may be $\frac{3}{4}$ to 1.25-fold of the amount of glycoconjugate in the first dose.

The amount of glycoconjugate is defined based on the amount of saccharide within the glycoconjugate, on a weight basis. For example, a first dose containing $\frac{1}{20}$ of the glycoconjugate of the second dose, will contain $\frac{1}{20}$ of the amount of conjugated saccharide present in the second dose on a weight to weight basis.

In some embodiments, the amount of glycoconjugate in the first dose and is the same as the amount of glycoconjugate in the second dose. In other embodiments, the amount of glycoconjugate in the first dose and is less than the amount of glycoconjugate in the second dose.

The glycoconjugate of the first dose and the glycoconjugate of the second dose may have different saccharides associated with a pathogen of interest, though will typically have the same saccharide.

The glycoconjugate of the first dose and the glycoconjugate of the second dose may have different carriers. The glycoconjugate of the first dose and the glycoconjugate of the second dose may have the same carrier Conveniently, the glycoconjugate of the first dose and second dose will be the same.

In light of the teaching herein, the amounts of glycoconjugate in the first and second (and subsequent doses if any) may be adapted by the skilled person dependent on the glycoconjugate and pathogen of interest to achieve a suitable balance of dose and immunological response.

Formulation

Compositions comprising glycoconjugates, for administration to a human, typically contain pharmaceutically acceptable diluents and/or excipients. Pharmaceutically acceptable diluents and excipients are well known and can be selected by those of skill in the art. Diluents include sterile water-for-injection, saline, glycerol, etc. Additionally, auxiliary substances, such as wetting or emulsifying agents, pH buffering substances, and the like, may be present. Sterile pyrogen-free, phosphate-buffered physiologic saline is a typical diluent. The diluent or excipient may also contain at least one component that increases solubility and/or prolongs stability. Examples of solubilizing/stabilizing agents include detergents, for example, laurel sarcosine and/or a polysorbate. Numerous pharmaceutically acceptable diluents and/or pharmaceutically acceptable excipients are known in the art and are described, e.g., in Remington's Pharmaceutical Sciences, by E. W. Martin, Mack Publishing Co., Easton, PA, 5th Edition (975). Suitable formulations may vary depending on the intended route of administration, e.g., intramuscular (IM) administration.

Immunogenic compositions and/or vaccines used in the present invention may be in aqueous form (e.g., a solution or suspension) or in a dried form (e.g., lyophilised). If a dried vaccine is used it will typically be reconstituted with a liquid medium prior to injection. Lyophilisation of vaccines is known in the art. To stabilise glycoconjugates during lyophilisation, it may be preferred to include a stabilizing agents such as a sugar alcohol (e.g., mannitol) and/or a disaccharide or polyol (e.g., sucrose or trehalose) in the composition. Suitably, stabilisers are used which are chemically distinct from the monosaccharide subunits of the glycoconjugate such that quantification of the amount of saccharide is not impacted by the presence of the stabilizer.

A buffer may be added to the composition. The pH of a liquid preparation is adjusted in view of the components of the composition and necessary suitability for administration to the subject. Suitably, the pH of a liquid mixture is at least 4, at least 5, at least 5.5, at least 5.8, at least 6. The pH of the liquid mixture may be less than 9, less than 8, less than 7.5 or less than 7. In other embodiments, pH of the liquid mixture is between 4 and 9, between 5 and 8, such as between 5.5 and 8. Consequently, the pH will suitably be between 6-9, such as 6.5-8.5. In a particularly preferred embodiment, the pH is between 5.8 and 6.4.

An appropriate buffer may be selected from acetate, citrate, histidine, maleate, phosphate, succinate, tartrate and TRIS. In one embodiment, the buffer is a phosphate buffer such as $Na/Na_2PO_4$, $Na/K_2PO_4$ or $K/K_2PO_4$.

The buffer can be present in the liquid mixture in an amount of at least 6 mM, at least 10 mM or at least 40 mM. The buffer can be present in the liquid mixture in an amount of less than 100 mM, less than 60 mM or less than 40 mM.

It is well known that for parenteral administration solutions should have a pharmaceutically acceptable osmolality to avoid cell distortion or lysis. A pharmaceutically acceptable osmolality will generally mean that solutions will have an osmolality which is approximately isotonic or mildly hypertonic. Suitably the compositions of the present invention when reconstituted will have an osmolality in the range of 250 to 750 mOsm/kg, for example, the osmolality may be in the range of 250 to 550 mOsm/kg, such as in the range of 280 to 500 mOsm/kg. In a particularly preferred embodiment, the osmolality may be in the range of 280 to 310 mOsm/kg.

Osmolality may be measured according to techniques known in the art, such as by the use of a commercially available osmometer, for example the Advanced™ Model 2020 available from Advanced Instruments Inc. (USA).

An "isotonicity agent" is a compound that is physiologically tolerated and imparts a suitable tonicity to a formulation to prevent the net flow of water across cell membranes that are in contact with the formulation. In some embodiments, the isotonicity agent used for the composition is a salt (or mixtures of salts), conveniently the salt is sodium chloride, suitably at a concentration of approximately 150 nM. In other embodiments, however, the composition comprises a non-ionic isotonicity agent and the concentration of sodium chloride in the composition is less than 100 mM, such as less than 80 mM, e.g., less than 50 mM, such as less 40 mM, less than 30 mM and especially less than 20 mM. The ionic strength in the composition may be less than 100 mM, such as less than 80 mM, e.g., less than 50 mM, such as less 40 mM or less than 30 mM.

In a particular embodiment, the non-ionic isotonicity agent is a polyol, such as sucrose and/or sorbitol. The concentration of sorbitol may e.g. between about 3% and about 15% (w/v), such as between about 4% and about 10% (w/v). Adjuvants comprising an immunologically active saponin fraction and a TLR4 agonist wherein the isotonicity agent is salt or a polyol have been described in WO2012080369.

Suitably, a human dose volume is between 0.05 ml and 1 ml, such as between 0.1 and 0.5 ml, in particular a dose volume of about 0.5 ml, or 0.7 ml. The volumes of the compositions used may depend on the delivery route and location, with smaller doses being given by the intradermal route. A unit dose container may contain an overage to allow for proper manipulation of materials during administration of the unit dose.

Compositions are intended for administration and therefore will typically be provided in a sterile injectable form (e.g., a form that is suitable for intramuscular injection). For example, in some embodiments, pharmaceutical compositions are provided in a liquid (e.g., aqueous) dosage form that is suitable for injection.

Kits are provided containing a first and second dose of glycoconjugate. Such kits will typically present the first and second dose of glycoconjugate separately in first and second containers, especially a first container containing a single first dose and a second container containing single second dose.

Terms

To facilitate review of the various embodiments of this disclosure, the following explanations of terms are provided. Additional terms and explanations are provided in the context of this disclosure. Although methods and materials similar or equivalent to those described herein can be used in the practice or testing of this disclosure, suitable methods and materials are described herein.

Unless otherwise explained, all technical and scientific terms used herein have the same meaning as commonly understood by one of ordinary skill in the art to which this disclosure belongs. Definitions of common terms in Vaccinology can be found, e.g., in Plotkin et al. (eds.), *Vaccines* 6th Edition, published by Saunders, 2012 (ISBN 9781455700905). Definitions of common terms in molecular biology can be found, e.g., in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8). Subunit vaccine preparation is generally described in 'Vaccine Design: The subunit and adjuvant approach' (Powell & Newman, eds.) (1995) Plenum Press New York)).

The singular terms "a," "an," and "the" include plural referents unless context clearly indicates otherwise. Similarly, the word "or" is intended to include "and" unless the context clearly indicates otherwise. The term "plurality" refers to two or more. It is further to be understood that all base sizes or amino acid sizes, and all molecular weight or molecular mass values, given for nucleic acids or polypeptides are approximate, and are provided for description. Additionally, numerical limitations given with respect to concentrations or levels of a substance, such as an antigen, are intended to be approximate. Thus, where a concentration is indicated to be at least (for example) 200 pg, it is intended that the concentration be understood to be at least approximately (or "about" or "~j") 200 pg.

As used herein, the term "comprises" means "includes." Thus, unless the context requires otherwise, the terms "comprising", "comprise" and "comprises" herein, when applied to a combination (e.g., a composition of multiple components, a process of multiple steps), are intended by the inventors to be interpreted as encompassing all the specifically mentioned features of the combination as well optional, additional, unspecified ones, whereas the terms "consisting of" and "consists of" encompasses only the specified features. Therefore, "comprising" includes as a limiting case the combination specified by "consisting of". In some implementations, the term "consisting essentially of" is used to refer, by way of non-limiting example, to a composition, whose only active ingredient is the indicated active ingredient(s), however, other compounds may be included which are for stabilizing, preserving, etc. the formulation, but are not involved directly in the therapeutic effect of the indicated active ingredient. Use of the transitional phrase "consisting essentially" means that the scope of a claim is to be interpreted to encompass the specified materials or steps recited in the claim, and those that do not materially affect the basic and novel characteristic(s) of the claimed invention. See, In re Herz, 537 F.2d 549, 551-52, 190 USPQ 461, 463 (CCPA 1976) (emphasis in the original); see also MPEP § 2111.03. Thus, the term "consisting essentially of" when used in a claim of this invention is not intended to be interpreted to be equivalent to "comprising".

The abbreviation, "e.g." is derived from the Latin exempli gratia, and is used herein to indicate a non-limiting example. Thus, the abbreviation "e.g." is synonymous with the term "for example."

The term "polypeptide" refers to a polymer in which the monomers are amino acid residues which are joined together through amide bonds. The terms "polypeptide" or "protein" as used herein are intended to encompass any amino acid sequence and include modified sequences such as glycoproteins. The term "polypeptide" is specifically intended to cover naturally occurring proteins, as well as those which are recombinantly or synthetically produced. The term "fragment," in reference to a polypeptide, refers to a portion (that is, a subsequence) of a polypeptide. The term "immunogenic fragment" refers to all fragments of a polypeptide that retain at least one predominant immunogenic epitope of the full-length reference protein or polypeptide. Orientation within a polypeptide is generally recited in an N-terminal to C-terminal direction, defined by the orientation of the amino and carboxy moieties of individual amino acids.

An "antigen" is a compound, composition, or substance that can stimulate the production of antibodies and/or a T cell response in a subject, including compositions that are injected, absorbed or otherwise introduced into a subject. The term "antigen" includes all related antigenic epitopes. The term "epitope" or "antigenic determinant" refers to a site on an antigen to which B and/or T cells respond. The "dominant antigenic epitopes" or "dominant epitope" are those epitopes to which a functionally significant host immune response, e.g., an antibody response or a T-cell response, is made. Thus, with respect to a protective immune response against a pathogen, the dominant antigenic epitopes are those antigenic moieties that when recognized by the host immune system result in protection from disease caused by the pathogen. The term "T-cell epitope" refers to an epitope that when bound to an appropriate MHC molecule is specifically recognised by a T cell (via a T cell receptor). A "B-cell epitope" is an epitope that is specifically recognised and then bound by an antibody (or B cell receptor molecule).

An "immune response" is a response of a cell of the immune system, such as a B cell, T cell, or monocyte, to a stimulus, such as a pathogen or antigen (e.g., formulated as an immunogenic composition or vaccine). An immune response can be a B cell response, which results in the production of specific antibodies, such as antigen specific neutralizing antibodies, bactericidal antibodies, opsonic antibodies, etc. An immune response can also be a T cell response, such as a CD4+ response or a CD8+ response. An immune response can be a "humoral" immune response, which is mediated by antibodies. In some cases, the response is specific for a particular antigen (that is, an "antigen-specific response"). If the antigen is derived from a pathogen, the antigen-specific response is a "pathogen-specific response." A "protective immune response" is an immune response that inhibits a detrimental function or activity of a pathogen, reduces infection by a pathogen, or decreases symptoms (including death) that result from infection by the pathogen. A protective immune response can be measured, for example, by the inhibition of pathogen replication, or by measuring resistance to pathogen challenge in vivo. Exposure of a subject to an immunogenic stimulus, such as a pathogen or antigen (e.g., formulated as an immunogenic composition or vaccine), elicits a primary immune response specific for the stimulus, that is, the exposure "primes" the immune response. A subsequent exposure, e.g., by immunization, to the stimulus can increase or "boost" the magnitude (or duration, or both) of the specific immune response. Thus, "boosting" a preexisting immune response by administering an immunogenic composition increases the magnitude of an antigen (or pathogen) specific response, (e.g., by increasing antibody titre and/or affinity, by increasing the frequency of antigen specific B or T cells, by inducing maturation effector function, or any combination thereof).

Use of the term "prime-boost" herein, or variations thereof, refers to a method in which a first administration (prime or priming dose) of an immunogenic composition comprising at least one antigen is followed by a subsequent administration of an immunogenic composition (boost or boosting dose) comprising the same at least one antigen, where a higher level of immune response to the antigen is induced upon the subsequent administration, as compared with the immune response that would have been achieved where the priming dose of the antigen is not provided.

An "immunogenic composition" is a composition of matter suitable for administration to a human or animal subject (e.g., in an experimental or clinical setting) that is capable of eliciting a specific immune response, e.g., against a pathogen. As such, an immunogenic composition includes one or more antigens or antigenic epitopes. An immunogenic composition can also include one or more additional components, such as an excipient, diluent, and/or adjuvant. In the context of this disclosure, the term immunogenic composition (including vaccine compositions or vaccines) will be understood to encompass compositions that are intended for administration to a subject or population of subjects for the purpose of eliciting a protective or therapeutic immune response.

The terms "vaccine composition" and "vaccine" are used interchangeably herein.

An "adjuvant" is an agent that enhances the production of an immune response in a non-antigen specific manner.

"Pharmaceutically acceptable" indicates a substance suitable for administration to a subject (e.g., a human, non-human primate, or other mammalian subject). Remington: The Science and Practice of Pharmacy, $22^{nd}$ edition, (2013), describes compositions and formulations (including diluents) suitable for pharmaceutical delivery of therapeutic and/or prophylactic compositions, including immunogenic compositions.

As used herein, a 'month' refers to a period of 30 days. It will be apparent to those in the art that a second immunization at a "30 day" interval is not limited to administration exactly 30 days later, but will encompass short variations due to issues such as clinic and patient scheduling; this tolerance similarly applies to other intervals, such as 45 days, 60 days, 90 days, 120 days, 150 days, 180 days, etc.

The term "infant" when referring to a human is typically between 0 and two years of age. The term "neonate" refers to an infant less than four weeks old.

The terms "reduce", "decrease", and "increase" are relative terms. Thus, an agent or treatment increases a response if the response is quantitatively increased following treatment, as compared to a different (reference) treatment (including placebo or no treatment).

'Treatment' as used herein encompasses vaccine administration; suitable reference treatments include the administration of a placebo, or the lack of vaccine administration.

The term "protects" is not meant to imply that an agent or treatment completely eliminates the risk of infection or disease, but that at least one characteristic of the infection or disease is substantially or significantly reduced or eliminated (compared to a relevant control). Thus, an immunogenic composition or treatment that protects against or reduces the risk of an infection or a disease, or symptom thereof, may not prevent or eliminate infection or disease in all treated subjects. Where the incidence of disease is known to be reduced in the relevant treated population (compared to a relevant control population), administration of the treatment to an individual is said to reduce the risk of disease in the treated individual.

As used herein, ng refers to nanograms, ug or µg refers to micrograms, mg refers to milligrams, mL or ml refers to milliliter, and mM refers to millimolar.

The term "saccharide" as used herein encompasses polysaccharides and oligosaccharides.

The terms 'around', 'about' or 'approximately' in respect of a given figure are defined as within 10% more or less of the given figure, in particular 5% more or less of the given figure.

The invention is illustrated by reference to the following clauses:

Clause 1. A method of administering a glycoconjugate to a subject, said method comprising the steps of:
(i) administering a first dose of glycoconjugate;
(ii) subsequently administering a second dose of glycoconjugate;
wherein the amount of glycoconjugate in the first dose is $\frac{1}{20}$ to $\frac{1}{5000}$ of the amount of glycoconjugate in the second dose.

Clause 2. A glycoconjugate for administration to a subject in a method comprising the steps of:
(i) administering a first dose of glycoconjugate;
(ii) subsequently administering a second dose of glycoconjugate;
wherein the amount of glycoconjugate in the first dose is $\frac{1}{20}$ to $\frac{1}{5000}$ of the amount of glycoconjugate in the second dose.

Clause 3. The use of a glycoconjugate in the manufacture of a medicament for administration to a subject in a method comprising the steps of:
(i) administering a first dose of glycoconjugate;
(ii) subsequently administering a second dose of glycoconjugate;
wherein the amount of glycoconjugate in the first dose is $\frac{1}{20}$ to $\frac{1}{5000}$ of the amount of glycoconjugate in the second dose.

Clause 4. A kit comprising:
(i) a first dose of glycoconjugate;
(ii) a second dose of glycoconjugate;
wherein the amount of glycoconjugate in the first dose is $\frac{1}{20}$ to $\frac{1}{5000}$ of the amount of glycoconjugate in the second dose.

Clause 5. A method of administering a glycoconjugate to a subject, said method comprising the steps of:
(i) administering a first dose of glycoconjugate;
(ii) subsequently administering a second dose of glycoconjugate;
wherein the amount of glycoconjugate in the first dose is $\frac{1}{5}$ to $\frac{1}{500}$ of the amount of glycoconjugate in the second dose.

Clause 6. A glycoconjugate for administration to a subject in a method comprising the steps of:
(i) administering a first dose of glycoconjugate;
(ii) subsequently administering a second dose of glycoconjugate;
wherein the amount of glycoconjugate in the first dose is $\frac{1}{5}$ to $\frac{1}{500}$ of the amount of glycoconjugate in the second dose.

Clause 7. The use of a glycoconjugate in the manufacture of a medicament for administration to a subject in a method comprising the steps of:
(i) administering a first dose of glycoconjugate;
(ii) subsequently administering a second dose of glycoconjugate;
wherein the amount of glycoconjugate in the first dose is $\frac{1}{5}$ to $\frac{1}{500}$ of the amount of glycoconjugate in the second dose.

Clause 8. A kit comprising:
(i) a first dose of glycoconjugate;
(ii) a second dose of glycoconjugate;

wherein the amount of glycoconjugate in the first dose is ⅕ to ¹⁄₅₀₀ of the amount of glycoconjugate in the second dose.

Clause 9. A method of administering a glycoconjugate to a subject, said method comprising the steps of:
(i) administering a first dose of 0.0005 to 0.5 ug of glycoconjugate;
(ii) subsequently administering a second dose of 1 to 30 ug of glycoconjugate.

Clause 10. A glycoconjugate for administration to a subject in a method comprising the steps of:
(i) administering a first dose of 0.0005 to 0.5 ug of glycoconjugate;
(ii) subsequently administering a second dose of 1 to 30 ug of glycoconjugate.

Clause 11. The use of a glycoconjugate in the manufacture of a medicament for administration to a subject in a method comprising the steps of:
(i) administering a first dose of 0.0005 to 0.5 ug of glycoconjugate;
(ii) subsequently administering a second dose of 1 to 30 ug of glycoconjugate.

Clause 12. A kit comprising:
(i) a first dose of 0.0005 to 0.5 ug of glycoconjugate;
(ii) a second dose of 1 to 30 ug of glycoconjugate.

Clause 13. A method of administering a glycoconjugate to a subject, said method comprising the steps of:
(i) administering a first dose of 0.005 to 2 ug of glycoconjugate;
(ii) subsequently administering a second dose of 1 to 30 ug of glycoconjugate;
wherein the amount of glycoconjugate in the second dose is at least twice the amount of glycoconjugate in the first dose.

Clause 14. A glycoconjugate for administration to a subject in a method comprising the steps of:
(i) administering a first dose of 0.005 to 2 ug of glycoconjugate;
(ii) subsequently administering a second dose of 1 to 30 ug of glycoconjugate;
wherein the amount of glycoconjugate in the second dose is at least twice the amount of glycoconjugate in the first dose.

Clause 15. The use of a glycoconjugate in the manufacture of a medicament for administration to a subject in a method comprising the steps of:
(i) administering a first dose of 0.005 to 2 ug of glycoconjugate;
(ii) subsequently administering a second dose of 1 to 30 ug of glycoconjugate;
wherein the amount of glycoconjugate in the second dose is at least twice the amount of glycoconjugate in the first dose.

Clause 16. A kit comprising:
(i) a first dose of 0.005 to 2 ug of glycoconjugate;
(ii) a second dose of 1 to 30 ug of glycoconjugate;
wherein the amount of glycoconjugate in the second dose is at least twice the amount of glycoconjugate in the first dose.

Clause 17. A method of administering a glycoconjugate to a subject, said method comprising the steps of:
(i) administering a first dose of ¹⁄₁₀ to ¹⁄₂₀₀₀ of a standard dose of glycoconjugate;
(ii) subsequently administering a second dose of ½ to 2-fold of a standard dose of glycoconjugate.

Clause 18. A glycoconjugate for administration to a subject in a method comprising the steps of:
(i) administering a first dose of ¹⁄₁₀ to ¹⁄₂₀₀₀ of a standard dose of glycoconjugate;
(ii) subsequently administering a second dose of ½ to 2-fold of a standard dose of glycoconjugate.

Clause 19. The use of a glycoconjugate in the manufacture of a medicament for administration to a subject in a method comprising the steps of:
(i) administering a first dose of ¹⁄₁₀ to ¹⁄₂₀₀₀ of a standard dose of glycoconjugate;
(ii) subsequently administering a second dose of ½ to 2-fold of a standard dose of glycoconjugate.

Clause 20. A kit comprising:
(i) a first dose of ¹⁄₁₀ to ¹⁄₂₀₀₀ of a standard dose of glycoconjugate;
(ii) a second dose of ½ to 2-fold of a standard dose of glycoconjugate.

Clause 21. A method of administering a glycoconjugate to a subject, said method comprising the steps of:
(i) administering a first dose of ⅕ to ¹⁄₅₀₀ of a standard dose of glycoconjugate;
(ii) subsequently administering a second dose of ½ to 2-fold of a standard dose of glycoconjugate.

Clause 22. A glycoconjugate for administration to a subject in a method comprising the steps of:
(i) administering a first dose of ⅕ to ¹⁄₅₀₀ of a standard dose of glycoconjugate;
(ii) subsequently administering a second dose of ½ to 2-fold of a standard dose of glycoconjugate.

Clause 23. The use of a glycoconjugate in the manufacture of a medicament for administration to a subject in a method comprising the steps of:
(i) administering a first dose of ⅕ to ¹⁄₅₀₀ of a standard dose of glycoconjugate;
(ii) subsequently administering a second dose of ½ to 2-fold of a standard dose of glycoconjugate.

Clause 24. A kit comprising:
(i) a first dose of ⅕ to ¹⁄₅₀₀ of a standard dose of glycoconjugate;
(ii) a second dose of ½ to 2-fold of a standard dose of glycoconjugate.

Clause 25. A method of administering a glycoconjugate to a subject, said method comprising the steps of:
(i) administering a first dose of 0.005 to 2 ug of glycoconjugate;
(ii) subsequently administering a second dose of 0.005 to 2 ug of glycoconjugate;
wherein the amount of glycoconjugate in the second dose is ½ to 5-fold the amount of glycoconjugate in the first dose.

Clause 26. A glycoconjugate for administration to a subject in a method comprising the steps of:
(i) administering a first dose of 0.005 to 2 ug of glycoconjugate;
(ii) subsequently administering a second dose of 0.005 to 2 ug of glycoconjugate;
wherein the amount of glycoconjugate in the second dose is ½ to 5-fold the amount of glycoconjugate in the first dose.

Clause 27. The use of a glycoconjugate in the manufacture of a medicament for administration to a subject in a method comprising the steps of:
(i) administering a first dose of 0.005 to 2 ug of glycoconjugate;
(ii) subsequently administering a second dose of 0.005 to 2 ug of glycoconjugate;

wherein the amount of glycoconjugate in the second dose is ½ to 5-fold the amount of glycoconjugate in the first dose.

Clause 28. A kit comprising:
(i) a first dose of 0.005 to 2 ug of glycoconjugate;
(ii) a second dose of 0.005 to 2 ug of glycoconjugate;
wherein the amount of glycoconjugate in the first dose is ½ to 5-fold of the amount of glycoconjugate in the second dose.

Clause 29. A method of administering a glycoconjugate to a subject, said method comprising the steps of:
(i) administering a first dose of ⅕ to 1/500 of a standard dose of glycoconjugate;
(ii) subsequently administering a second dose of ⅕ to 1/500 of a standard dose of glycoconjugate;
wherein the amount of glycoconjugate in the second dose is ½ to 5-fold the amount of glycoconjugate in the first dose.

Clause 30. A glycoconjugate for administration to a subject in a method comprising the steps of:
(i) administering a first dose of ⅕ to 1/500 of a standard dose of glycoconjugate;
(ii) subsequently administering a second dose of ⅕ to 1/500 of a standard dose of glycoconjugate;
wherein the amount of glycoconjugate in the second dose is ½ to 5-fold the amount of glycoconjugate in the first dose.

Clause 31. The use of a glycoconjugate in the manufacture of a medicament for administration to a subject in a method comprising the steps of:
(i) administering a first dose of ⅕ to 1/500 of a standard dose of glycoconjugate;
(ii) subsequently administering a second dose of ⅕ to 1/500 of a standard dose of glycoconjugate;
wherein the amount of glycoconjugate in the second dose is ½ to 5-fold the amount of glycoconjugate in the first dose.

Clause 32. A kit comprising:
(i) a first dose of ⅕ to 1/500 of a standard dose of glycoconjugate;
(ii) a second dose of ⅕ to 1/500 a standard dose of glycoconjugate;
wherein the amount of glycoconjugate in the first dose is ½ to 5-fold of the amount of glycoconjugate in the second dose.

Clause 33. The method, glycoconjugate, use or kit according to any one of clauses 1 to 32, wherein the glyconjugate includes a bacterial saccharide, such as a bacterial capsular saccharide.

Clause 34. The method, glycoconjugate, use or kit according to any one of clauses 1 to 33 wherein the glycoconjugate of the first dose and the glycoconjugate of the second dose have different saccharides.

Clause 35. The method, glycoconjugate, use or kit according to any one of clauses 1 to 34 wherein the glycoconjugate of the first dose and the glycoconjugate of the second dose have the same saccharide.

Clause 36. The method, glycoconjugate, use or kit according to any one of clauses 1 to 35 wherein the glycoconjugate of the first dose and the glycoconjugate of the second dose have different carriers.

Clause 37. The method, glycoconjugate, use or kit according to any one of clauses 1 to 36 wherein the glycoconjugate of the first dose and the glycoconjugate of the second dose have the same carrier.

Clause 38. The method, glycoconjugate, use or kit according to any one of clauses 1 to 37 wherein the glycoconjugate of the first dose and second dose are the same.

Clause 39. The method, glycoconjugate, use or kit according to any one of clauses 1 to 38 wherein the glycoconjugate of the first dose comprises a saccharide derived from *N. meningitidis*, in particular serogroup A (MenA), C (MenC), W135 (MenW), Y (MenY) or X (MenX).

Clause 40. The method, glycoconjugate, use or kit according to clause 39 wherein the glycoconjugate of the first dose comprises a saccharide derived from *N. meningitidis* serogroup A (MenA).

Clause 41. The method, glycoconjugate, use or kit according to clause 39 wherein the glycoconjugate of the first dose comprises a saccharide derived from *N. meningitidis* serogroup C (MenC).

Clause 42. The method, glycoconjugate, use or kit according to clause 39 wherein the glycoconjugate of the first dose comprises a saccharide derived from *N. meningitidis* serogroup W (MenW).

Clause 43. The method, glycoconjugate, use or kit according to clause 39 wherein the glycoconjugate of the first dose comprises a saccharide derived from *N. meningitidis* serogroup Y (MenY).

Clause 44. The method, glycoconjugate, use or kit according to any one of clauses 1 to 38 wherein the glycoconjugate of the first dose comprises a saccharide derived from *Salmonella typhi* Vi saccharide.

Clause 45. The method, glycoconjugate, use or kit according to any one of clauses 1 to 38 wherein the glycoconjugate of the first dose comprises a saccharide derived from Hib from *H. influenzae* type b.

Clause 46. The method, glycoconjugate, use or kit according to any one of clauses 1 to 38 wherein the glycoconjugate of the first dose comprises a saccharide derived from *Streptococcus pneumoniae*, in particular serotypes 1, 2, 3, 4, 5, 6A, 6B, 7F, 8, 9N, 9V, 10A, 11A, 12F, 14, 15B, 17F, 18C, 19A, 19F, 20, 22F, 23F or 33F.

Clause 47. The method, glycoconjugate, use or kit according to any one of clauses 1 to 38 wherein the glycoconjugate of the first dose comprises a saccharide derived from Group B *Streptococcus*, in particular group Ia, Ib, II, III, IV, V, VI or VII.

Clause 48. The method, glycoconjugate, use or kit according to any one of clauses 1 to 47 wherein the glycoconjugate of the second dose comprises a saccharide derived from *N. meningitidis*, in particular serogroup A (MenA), C (MenC), W135 (MenW), Y (MenY) or X (MenX).

Clause 49. The method, glycoconjugate, use or kit according to clause 48 wherein the glycoconjugate of the second dose comprises a saccharide derived from *N. meningitidis* serogroup A (MenA).

Clause 50. The method, glycoconjugate, use or kit according to clause 48 wherein the glycoconjugate of the second dose comprises a saccharide derived from *N. meningitidis* serogroup C (MenC).

Clause 51. The method, glycoconjugate, use or kit according to clause 48 wherein the glycoconjugate of the second dose comprises a saccharide derived from *N. meningitidis* serogroup W (MenW).

Clause 52. The method, glycoconjugate, use or kit according to clause 48 wherein the glycoconjugate of the second dose comprises a saccharide derived from *N. meningitidis* serogroup Y (MenY).

Clause 53. The method, glycoconjugate, use or kit according to any one of clauses 1 to 47 wherein the glycoconjugate of the second dose comprises a saccharide derived from *Salmonella typhi* Vi saccharide.

Clause 54. The method, glycoconjugate, use or kit according to any one of clauses 1 to 47 wherein the glycoconjugate of the second dose comprises a saccharide derived from Hib from *H. influenzae* type b.

Clause 55. The method, glycoconjugate, use or kit according to any one of clauses 1 to 47 wherein the glycoconjugate of the second dose comprises a saccharide derived from *Streptococcus pneumoniae*, in particular serotypes 1, 2, 3, 4, 5, 6A, 6B, 7F, 8, 9N, 9V, 10A, 11A, 12F, 14, 15B, 17F, 18C, 19A, 19F, 20, 22F, 23F or 33F.

Clause 56. The method, glycoconjugate, use or kit according to any one of clauses 1 to 47 wherein the glycoconjugate of the second dose comprises a saccharide derived from Group B *Streptococcus*, in particular group Ia, Ib, II, III, IV, V, VI or VII.

Clause 57. The method, glycoconjugate, use or kit according to any one of clauses 1 to 56 wherein the glycoconjugate of the first dose comprises a carrier which is tetanus toxoid, a fragment thereof or a non-toxic mutant thereof.

Clause 58. The method, glycoconjugate, use or kit according to clause 57 wherein the glycoconjugate of the first dose comprises a carrier which is tetanus toxoid.

Clause 59. The method, glycoconjugate, use or kit according to any one of clauses 1 to 56 wherein the glycoconjugate of the first dose comprises a carrier which is diphtheria toxoid, a fragment thereof or a non-toxic mutant thereof.

Clause 60. The method, glycoconjugate, use or kit according to clause 59 wherein the glycoconjugate of the first dose comprises a carrier which is diphtheria toxoid.

Clause 61. The method, glycoconjugate, use or kit according to clause 59 wherein the glycoconjugate of the first dose comprises a carrier which is CRM197.

Clause 62. The method, glycoconjugate, use or kit according to any one of clauses 1 to 56 wherein the glycoconjugate of the first dose comprises a carrier which is an OMPC.

Clause 63. The method, glycoconjugate, use or kit according to any one of clauses 1 to 56 wherein the glycoconjugate of the first dose comprises a carrier which is a *H. influenzae* protein D.

Clause 64. The method, glycoconjugate, use or kit according to any one of clauses 1 to 63 wherein the glycoconjugate of the second dose comprises a carrier which is tetanus toxoid, a fragment thereof or a non-toxic mutant thereof.

Clause 65. The method, glycoconjugate, use or kit according to clause 64 wherein the glycoconjugate of the second dose comprises a carrier which is tetanus toxoid.

Clause 66. The method, glycoconjugate, use or kit according to any one of clauses 1 to 63 wherein the glycoconjugate of the second dose comprises a carrier which is diphtheria toxoid, a fragment thereof or a non-toxic mutant thereof.

Clause 67. The method, glycoconjugate, use or kit according to clause 66 wherein the glycoconjugate of the second dose comprises a carrier which is diphtheria toxoid.

Clause 68. The method, glycoconjugate, use or kit according to clause 66 wherein the glycoconjugate of the second dose comprises a carrier which is CRM197.

Clause 69. The method, glycoconjugate, use or kit according to any one of clauses 1 to 63 wherein the glycoconjugate of the second dose comprises a carrier which is an OMPC.

Clause 70. The method, glycoconjugate, use or kit according to any one of clauses 1 to 63 wherein the glycoconjugate of the second dose comprises a carrier which is a *H. influenzae* protein D.

Clause 71. The method, glycoconjugate, use or kit according to any one of clauses 1 to 70 wherein the glycoconjugate of the first dose has a saccharide:protein ratio (w/w) of between 1:5 and 5:1, in particular ratios between 1:5 and 2:1.

Clause 72. The method, glycoconjugate, use or kit according to any one of clauses 1 to 70 wherein the glycoconjugate of the second dose has a saccharide:protein ratio (w/w) of between 1:5 and 5:1, in particular ratios between 1:5 and 2:1.

Clause 73. The method, glycoconjugate, use or kit according to any one of clauses 1 to 72 wherein the glycoconjugate of the first dose is unadjuvanted.

Clause 74. The method, glycoconjugate, use or kit according to any one of clauses 1 to 72 wherein the glycoconjugate of the first dose is adjuvanted.

Clause 75. The method, glycoconjugate, use or kit according to clause 74 wherein the glycoconjugate of the first dose is adjuvanted with an aluminum salt, in particular aluminum hydroxide or aluminum phosphate.

Clause 76. The method, glycoconjugate, use or kit according to either clause 74 or 75 wherein the glycoconjugate of the first dose is adjuvanted with a TLR4 agonist, in particular, a lipopolysaccharide, such as 3D-MPL, CRX601 or a GLA, especially 3D-MPL.

Clause 77. The method, glycoconjugate, use or kit according to any one of clauses 74 to 76 wherein the glycoconjugate of the first dose is adjuvanted with a saponin, in particular Quil A or a derivative thereof, especially QS21.

Clause 78. The method, glycoconjugate, use or kit according to any one of clauses 74 to 77 wherein the glycoconjugate of the first dose is adjuvanted with an agonist of TLR7 and/or TLR8, in particular 4-amino-1-[2-(1,2-dipalmitoyl-sn-glycero-3 triethyleneglycol-phospho) ethyl]-2-n-butyl-1H-imidazo[4,5-c]quinoline or (3-(5-amino-2-(2-methyl-4-(2-(2-(2-phosphonoethoxy) ethoxy)ethoxy)phenethyl) benzo[f][1,7]naphthyridin-8-yl)propanoic acid.

Clause 79. The method, glycoconjugate, use or kit according to any one of clauses 74 to 78 wherein the glycoconjugate of the first dose is adjuvanted with an oil in water emulsion, such as a squalene containing submicron oil-in-water emulsion.

Clause 80. The method, glycoconjugate, use or kit according to any one of clauses 74 to 78 wherein the glycoconjugate of the first dose is adjuvanted with a liposomal formulation.

Clause 81. The method, glycoconjugate, use or kit according to any one of clauses 1 to 80 wherein the glycoconjugate of the second dose is unadjuvanted.

Clause 82. The method, glycoconjugate, use or kit according to any one of clauses 1 to 80 wherein the glycoconjugate of the second dose is adjuvanted.

Clause 83. The method, glycoconjugate, use or kit according to clause 82 wherein the glycoconjugate of the second dose is adjuvanted with an aluminum salt, in particular aluminum hydroxide or aluminum phosphate.

Clause 84. The method, glycoconjugate, use or kit according to either clause 82 or 83 wherein the glycoconjugate of the second dose is adjuvanted with a TLR4 agonist, in particular, a lipopolysaccharide, such as 3D-MPL, CRX601 or a GLA, especially 3D-MPL.

Clause 85. The method, glycoconjugate, use or kit according to any one of clauses 82 to 84 wherein the glycoconjugate of the second dose is adjuvanted with a saponin, in particular Quil A or a derivative thereof, especially QS21.

Clause 86. The method, glycoconjugate, use or kit according to any one of clauses 82 to 85 wherein the glycoconjugate of the second dose is adjuvanted with an agonist of TLR7 and/or TLR8, in particular 4-amino-1-[2-(1,2-dipalmitoyl-sn-glycero-3 triethyleneglycol-phospho)ethyl]-2-n-butyl-1H-imidazo[4,5-c]quinoline or (3-(5-amino-2-(2-methyl-4-(2-(2-(2-phosphonoethoxy)ethoxy)ethoxy)phenethyl) benzo[f][1,7]naphthyridin-8-yl)propanoic acid.

Clause 87. The method, glycoconjugate, use or kit according to any one of clauses 82 to 86 wherein the glycoconjugate of the first dose is adjuvanted with an oil in water emulsion, such as a squalene containing submicron oil-in-water emulsion.

Clause 88. The method, glycoconjugate, use or kit according to any one of clauses 82 to 86 wherein the glycoconjugate of the first dose is adjuvanted with a liposomal formulation.

Clause 89. The method, glycoconjugate, use or kit according to any one of clauses 1 to 88 wherein the subject is a mammal.

Clause 90. The method, glycoconjugate, use or kit according to clause 89 wherein the subject is a human.

Clause 91. The method, glycoconjugate, use or kit according to clause 90 wherein the subject is a human child, such as less than 1 year old, 1 to 5 years old of the first dose or 5 to 18 years old at the time of administration of the first dose.

Clause 92. The method, glycoconjugate, use or kit according to clause 90 wherein the subject is a human adult.

Clause 93. The method, glycoconjugate, use or kit according to clause 92 wherein the human adult is 18 to 40 years old.

Clause 94. The method, glycoconjugate, use or kit according to clause 90 wherein the subject is an elderly human, in particular greater than 65 years old.

Clause 95. The method, glycoconjugate, use or kit according to any one of clauses 1 to 94 wherein the subject has not previously been vaccinated with a glycoconjugate vaccine against the applicable pathogen, such as not previously been vaccinated against the applicable pathogen, such as bacterium.

Clause 96. The method, glycoconjugate, use or kit according to clause 95 wherein the subject has not previously been vaccinated against the applicable pathogen, such as bacterium.

Clause 97. The method, glycoconjugate, use or kit according to any one of clauses 1 to 94 wherein the subject has previously been vaccinated against the applicable pathogen, such as bacterium.

Clause 98. The method, glycoconjugate, use or kit according to clause 97 wherein the subject has previously been vaccinated with a glycoconjugate vaccine against the applicable pathogen, such as bacterium.

Clause 99. The method, glycoconjugate, use or kit according to any one of clauses 1 to 94 wherein the subject has not previously been vaccinated against the bacterium.

Clause 100. The method, glycoconjugate, use or kit according to any one of clauses 1 to 94 wherein the subject has previously been vaccinated against the bacterium.

Clause 101. The method, glycoconjugate, use or kit according to any one of clauses 1 to 100 wherein the first dose is administered intradermally, intramuscularly, intraperitoneally or subcutaneously, in particular intramuscularly.

Clause 102. The method, glycoconjugate, use or kit according to any one of clauses 1 to 100 wherein the second dose intradermally, intramuscularly, intraperitoneally or subcutaneously, in particular intramuscularly.

Clause 103. The method, glycoconjugate, use or kit according to any one of clauses 1 to 102 wherein the all doses are administered via the same route.

Clause 104. The method, glycoconjugate, use or kit according to any one of clauses 1 to 103 further comprising a third dose of glycoconjugate.

Clause 105. The method, glycoconjugate, use or kit according to any one of clauses 1 to 104 wherein the second dose is administered 1 week to 12 months after the first dose, such as 2 weeks to 9 months after the first dose, especially 3 weeks to 6 months after the first dose, in particular 3 weeks to 3 months after the first dose and desirably 3 weeks to 2 months after the first dose, for example 3 to 5 weeks after the first dose.

Clause 106. The method, glycoconjugate, use or kit according to clause 106 wherein the second dose is administered 2, 3, 4, 5, 6, 7, 8, 9 or 10 weeks after the first dose.

Clause 107. The method, glycoconjugate, use or kit according to clause 107 wherein the second dose is administered 2, 3, 4, 5 or 6 months after the first dose.

Clause 108. The method, glycoconjugate, use or kit according to any one of clauses 1 to 104 wherein the second dose is administered 3 weeks to 12 months after the first dose, such as 3 weeks to 9 months after the first dose, especially 3 weeks to 6 months after the first dose, in particular 3 weeks to 3 months after the first dose and desirably 3 weeks to 2 months after the first dose.

Clause 109. The method, glycoconjugate, use or kit according to clause 108 wherein the second dose is administered 3, 4, 5, 6, 7, 8, 9 or 10 weeks after the first dose.

Clause 110. The method, glycoconjugate, use or kit according to clause 108 wherein the second dose is administered 3, 4, 5 or 6 months after the first dose.

Clause 111. The method, glycoconjugate, use or kit according to any one of clauses 1 to 110 wherein the amount of glycoconjugate in the first dose is $\frac{1}{20}$ to $\frac{1}{5000}$ of the amount of glycoconjugate in the second dose.

Clause 112. The method, glycoconjugate, use or kit according to clause 111 wherein the amount of glycoconjugate in the first dose is $\frac{1}{1000}$ to $\frac{1}{5000}$ of the amount of glycoconjugate in the second dose.

Clause 113. The method, glycoconjugate, use or kit according to clause 111 wherein the amount of glycoconjugate in the first dose is $\frac{1}{100}$ to $\frac{1}{1000}$ of the amount of glycoconjugate in the second dose.

Clause 114. The method, glycoconjugate, use or kit according to clause 111 wherein the amount of glycoconjugate in the first dose is $\frac{1}{20}$ to $\frac{1}{100}$ of the amount of glycoconjugate in the second dose.

Clause 115. The method, glycoconjugate, use or kit according to any one of clauses 1 to 110 wherein the amount of glycoconjugate in the first dose is ⅕ to ¹⁄₅₀₀ of the amount of glycoconjugate in the second dose.

Clause 116. The method, glycoconjugate, use or kit according to clause 115 wherein the amount of glycoconjugate in the first dose is ¹⁄₁₀₀ to ¹⁄₅₀₀ of the amount of glycoconjugate in the second dose.

Clause 117. The method, glycoconjugate, use or kit according to clause 115 wherein the amount of glycoconjugate in the first dose is ¹⁄₂₅ to ¹⁄₁₀₀ of the amount of glycoconjugate in the second dose.

Clause 118. The method, glycoconjugate, use or kit according to clause 115 wherein the amount of glycoconjugate in the first dose is ⅕ to ¹⁄₂₅ of the amount of glycoconjugate in the second dose, such as ⅛ to ¹⁄₂₅, in particular ¹⁄₁₀ to ¹⁄₂₅.

Clause 119. The method, glycoconjugate, use or kit according to clause 118 wherein the amount of glycoconjugate in the first dose is ¹⁄₁₀ of the amount of glycoconjugate in the second dose.

Clause 120. The method, glycoconjugate, use or kit according to clause 118 wherein the amount of glycoconjugate in the first dose is ¹⁄₅₀ of the amount of glycoconjugate in the second dose.

Clause 121. The method, glycoconjugate, use or kit according to any one of clauses 1 to 120 wherein the amount of glycoconjugate in the first dose is 0.0005 to 0.5 ug.

Clause 122. The method, glycoconjugate, use or kit according to clause 121 wherein the amount of glycoconjugate in the first dose is 0.0005 to 0.005 ug.

Clause 123. The method, glycoconjugate, use or kit according to clause 121 wherein the amount of glycoconjugate in the first dose is 0.005 to 0.05 ug.

Clause 124. The method, glycoconjugate, use or kit according to clause 121 wherein the amount of glycoconjugate in the first dose is 0.05 to 0.5 ug.

Clause 125. The method, glycoconjugate, use or kit according to any one of clauses 1 to 120 wherein the amount of glycoconjugate in the first dose is 0.005 to 2 ug.

Clause 126. The method, glycoconjugate, use or kit according to clause 125 wherein the amount of glycoconjugate in the first dose is 0.005 to 0.05 ug.

Clause 127. The method, glycoconjugate, use or kit according to clause 125 wherein the amount of glycoconjugate in the first dose is 0.05 to 0.3 ug.

Clause 128. The method, glycoconjugate, use or kit according to clause 125 wherein the amount of glycoconjugate in the first dose is 0.3 to 1 ug.

Clause 129. The method, glycoconjugate, use or kit according to clause 125 wherein the amount of glycoconjugate in the first dose is 0.1 to 2 ug, especially 0.3 to 1.5 ug, in particular 0.5 to 1 ug, such as 0.5 ug or 1 ug.

Clause 130. The method, glycoconjugate, use or kit according to clause 125 wherein the amount of glycoconjugate in the first dose is 0.01 to 0.5 ug, especially 0.05 to 0.3 ug, in particular 0.1 to 0.2 ug, such as 0.1 ug or 0.2 ug.

Clause 131. The method, glycoconjugate, use or kit according to any one of clauses 1 to 130 wherein the amount of glycoconjugate in the second dose is 1 to 30 ug.

Clause 132. The method, glycoconjugate, use or kit according to clause 131 wherein the amount of glycoconjugate in the second dose is 1 to 15 ug.

Clause 133. The method, glycoconjugate, use or kit according to clause 131 wherein the amount of glycoconjugate in the second dose is 15 to 30 ug.

Clause 134. The method, glycoconjugate, use or kit according to clause 131 wherein the amount of glycoconjugate in the second dose is 5 to 25 ug.

Clause 135. The method, glycoconjugate, use or kit according to any one of clauses 1 to 134 wherein the amount of glycoconjugate in the first dose is ¹⁄₁₀ to ¹⁄₂₀₀₀ of a standard dose of glycoconjugate.

Clause 136. The method, glycoconjugate, use or kit according to clause 135 wherein the amount of glycoconjugate in the first dose is ¹⁄₅₀₀ to ¹⁄₂₀₀₀ of a standard dose of glycoconjugate.

Clause 137. The method, glycoconjugate, use or kit according to clause 135 wherein the amount of glycoconjugate in the first dose is ¹⁄₅₀ to ¹⁄₅₀₀ of a standard dose of glycoconjugate.

Clause 138. The method, glycoconjugate, use or kit according to clause 135 wherein the amount of glycoconjugate in the first dose is ¹⁄₁₀ to ¹⁄₅₀ of a standard dose of glycoconjugate.

Clause 139. The method, glycoconjugate, use or kit according to any one of clauses 1 to 134 wherein the amount of glycoconjugate in the first dose is ⅕ to ¹⁄₅₀₀ of a standard dose of glycoconjugate.

Clause 140. The method, glycoconjugate, use or kit according to clause 139 wherein the amount of glycoconjugate in the first dose is ¹⁄₁₀₀ to ¹⁄₅₀₀ of a standard dose of glycoconjugate.

Clause 141. The method, glycoconjugate, use or kit according to clause 139 wherein the amount of glycoconjugate in the first dose is ¹⁄₂₅ to ¹⁄₁₀₀ of a standard dose of glycoconjugate.

Clause 142. The method, glycoconjugate, use or kit according to clause 139 wherein the amount of glycoconjugate in the first dose is ⅕ to ¹⁄₂₅ of a standard dose of glycoconjugate, such as ⅛ to ¹⁄₂₅, in particular ¹⁄₁₀ to ¹⁄₂₅.

Clause 143. The method, glycoconjugate, use or kit according to clause 139 wherein the amount of glycoconjugate in the first dose is ¹⁄₁₀ of a standard dose of glycoconjugate.

Clause 144. The method, glycoconjugate, use or kit according to clause 139 wherein the amount of glycoconjugate in the first dose is ¹⁄₅₀ of a standard dose of glycoconjugate.

Clause 145. The method, glycoconjugate, use or kit according to any one of clauses 1 to 144 wherein the amount of glycoconjugate in the second dose is ½ to 2-fold of a standard dose of glycoconjugate.

Clause 146. The method, glycoconjugate, use or kit according to clause 145 wherein the amount of glycoconjugate in the second dose is ½ to a standard dose of glycoconjugate.

Clause 147. The method, glycoconjugate, use or kit according to clause 145 wherein the amount of glycoconjugate in the second dose is a standard dose to 2-fold of a standard dose of glycoconjugate.

Clause 148. The method, glycoconjugate, use or kit according to clause 145 wherein the amount of glycoconjugate in the second dose is ¾ to 1.25-fold of a standard dose of glycoconjugate.

Clause 145. The method, glycoconjugate, use or kit according to any one of clauses 1 to 148, wherein the amount of glycoconjugate in the second dose is at least twice the amount of glycoconjugate in the first dose.

Clause 146. The method, glycoconjugate, use or kit according to clause 145 wherein the amount of glycoconjugate in the second dose is at least five times the amount of glycoconjugate in the first dose.

Clause 147. The method, glycoconjugate, use or kit according to clause 146 wherein the amount of glycoconjugate in the second dose is 5 to 25 times the amount of glycoconjugate in the first dose.

Clause 148. The method, glycoconjugate, use or kit according to clause 146 wherein the amount of glycoconjugate in the second dose is 25 to 100 times the amount of glycoconjugate in the first dose.

Clause 149. The method, glycoconjugate, use or kit according to clause 146 wherein the amount of glycoconjugate in the second dose is 10 times the amount of glycoconjugate in the first dose.

Clause 150. The method, glycoconjugate, use or kit according to clause 146 wherein the amount of glycoconjugate in the second dose is 50 times the amount of glycoconjugate in the first dose.

Clause 151. The method, glycoconjugate, use or kit according to any one of clauses 1 to 150 wherein the amount of glycoconjugate in the second dose is $1/5$ to $1/500$ of a standard dose of glycoconjugate.

Clause 152. The method, glycoconjugate, use or kit according to clause 151 wherein the amount of glycoconjugate in the second dose is $1/100$ to $1/500$ of a standard dose of glycoconjugate.

Clause 153. The method, glycoconjugate, use or kit according to clause 151 wherein the amount of glycoconjugate in the second dose is $1/25$ to $1/100$ of a standard dose of glycoconjugate.

Clause 154. The method, glycoconjugate, use or kit according to clause 151 wherein the amount of glycoconjugate in the second dose is $1/5$ to $1/25$ of a standard dose of glycoconjugate, such as $1/8$ to $1/25$, in particular $1/10$ to $1/25$.

Clause 155. The method, glycoconjugate, use or kit according to clause 151 wherein the amount of glycoconjugate in the second dose is $1/10$ of a standard dose of glycoconjugate.

Clause 156. The method, glycoconjugate, use or kit according to clause 151 wherein the amount of glycoconjugate in the second dose is $1/50$ of a standard dose of glycoconjugate.

Clause 157. The method, glycoconjugate, use or kit according to any one of clauses 1 to 156 wherein the amount of glycoconjugate in the second dose is 0.005 to 2 ug.

Clause 158. The method, glycoconjugate, use or kit according to clause 157 wherein the amount of glycoconjugate in the second dose is 0.005 to 0.05 ug.

Clause 159. The method, glycoconjugate, use or kit according to clause 157 wherein the amount of glycoconjugate in the second dose is 0.05 to 0.3 ug.

Clause 160. The method, glycoconjugate, use or kit according to clause 157 wherein the amount of glycoconjugate in the second dose is 0.3 to 1 ug.

Clause 161. The method, glycoconjugate, use or kit according to clause 157 wherein the amount of glycoconjugate in the second dose is 0.1 to 2 ug, especially 0.3 to 1.5 ug, in particular 0.5 to 1 ug, such as 0.5 ug or 1 ug.

Clause 162. The method, glycoconjugate, use or kit according to clause 157 wherein the amount of glycoconjugate in the second dose is 0.01 to 0.5 ug, especially 0.05 to 0.3 ug, in particular 0.1 to 0.2 ug, such as 0.1 ug or 0.2 ug.

Clause 163. The method, glycoconjugate, use or kit according to any one of clauses 1 to 162 wherein the amount of glycoconjugate in the second dose is $1/5$ to $1/500$ of a standard dose of glycoconjugate.

Clause 164. The method, glycoconjugate, use or kit according to clause 163 wherein the amount of glycoconjugate in the second dose is $1/100$ to $1/500$ of a standard dose of glycoconjugate.

Clause 165. The method, glycoconjugate, use or kit according to clause 163 wherein the amount of glycoconjugate in the second dose is $1/25$ to $1/100$ of a standard dose of glycoconjugate.

Clause 166. The method, glycoconjugate, use or kit according to clause 163 wherein the amount of glycoconjugate in the second dose is $1/5$ to $1/25$ of a standard dose of glycoconjugate, such as $1/8$ to $1/25$, in particular $1/10$ to $1/25$.

Clause 167. The method, glycoconjugate, use or kit according to clause 163 wherein the amount of glycoconjugate in the second dose is $1/10$ of a standard dose of glycoconjugate.

Clause 168. The method, glycoconjugate, use or kit according to clause 163 wherein the amount of glycoconjugate in the second dose is $1/50$ of a standard dose of glycoconjugate.

Clause 169. The method, glycoconjugate, use or kit according to any one of clauses 1 to 162 wherein the amount of glycoconjugate in the second dose is $1/2$ to 5-fold the amount of glycoconjugate in the first dose.

Clause 170. The method, glycoconjugate, use or kit according to clause 169 wherein the amount of glycoconjugate in the second dose is $1/2$ to 2-fold of the amount of glycoconjugate in the first dose.

Clause 171. The method, glycoconjugate, use or kit according to clause 170 wherein the amount of glycoconjugate in the second dose is $3/4$ to 1.25-fold of the amount of glycoconjugate in the first dose.

Clause 172. The method, glycoconjugate, use or kit according to any one of clauses 1 to 171 wherein the saccharide of the glycoconjugate is 2000 to 100000 Da.

Clause 173. The method, glycoconjugate, use or kit according to any one of clauses 1 to 171 wherein the saccharide of the glycoconjugate is 50000 to 1000000 Da.

Clause 174. The method, glycoconjugate, use or kit according to any one of clauses 1 to 171 wherein the saccharide of the glycoconjugate is 50000 to 1000000 Da.

Clause 175. The method, glycoconjugate, use or kit according to any one of clauses 1 to 174 wherein the first dose comprises a combination of glycoconjugates.

Clause 176. The method, glycoconjugate, use or kit according to clause 175 wherein the first dose comprises a combination of *N. meningitidis* glycoconjugates, such as a combination of MenA, MenC, MenW and MenY glycoconjugates.

Clause 177. The method, glycoconjugate, use or kit according to clause 175 wherein the first dose comprises a combination of Pneumococcus glycoconjugates, such as comprising a combination of serotype 1, 4, 5, 6B, 7F, 9V, 14, 18C, 19F and 23F glycoconjugates Clause 178. The method, glycoconjugate, use or kit according to clause 175 wherein the first dose comprises a combination of GBS glycoconjugates, such as comprising a combination of serotype Ia, Ib and III glycoconjugates, especially serotype Ia, Ib, II, III, IV and V glycoconjugates.

Clause 179. The method, glycoconjugate, use or kit according to any one of clauses 1 to 178 wherein the second dose comprises a combination of glycoconjugates.

Clause 180. The method, glycoconjugate, use or kit according to clause 179 wherein the second dose comprises a combination of *N. meningitidis* glycoconjugates, such as a combination of MenA, MenC, MenW and MenY glycoconjugates.

Clause 181. The method, glycoconjugate, use or kit according to any one of clauses 1 to 180, wherein the first dose comprises 1 ug Men A saccharide conjugated to CRM197 carrier and the second dose second dose comprises 1 ug MenA saccharide conjugated to CRM197 carrier, the second dose suitably being administered one month after the first dose.

Clause 182. The method, glycoconjugate, use or kit according to any one of clauses 1 to 181, wherein the first dose comprises 0.5 ug Men A saccharide conjugated to CRM197 carrier and the second dose second dose comprises 0.5 ug MenC saccharide conjugated to CRM197 carrier, the second dose suitably being administered one month after the first dose.

Clause 183. The method, glycoconjugate, use or kit according to any one of clauses 1 to 182, wherein the first dose comprises 0.5 ug Men A saccharide conjugated to CRM197 carrier and the second dose second dose comprises 0.5 ug MenW saccharide conjugated to CRM197 carrier, the second dose suitably being administered one month after the first dose.

Clause 184. The method, glycoconjugate, use or kit according to any one of clauses 1 to 183, wherein the first dose comprises 0.5 ug Men A saccharide conjugated to CRM197 carrier and the second dose second dose comprises 0.5 ug MenY saccharide conjugated to CRM197 carrier, the second dose suitably being administered one month after the first dose.

Clause 185. The method, glycoconjugate, use or kit according to any one of clauses 1 to 180, wherein the first dose comprises 1 ug Men A saccharide conjugated to CRM197 carrier and the second dose second dose comprises 10 ug MenA saccharide conjugated to CRM197 carrier, the second dose suitably being administered one month after the first dose.

Clause 186. The method, glycoconjugate, use or kit according to any one of clauses 1 to 180 or 185, wherein the first dose comprises 0.5 ug Men A saccharide conjugated to CRM197 carrier and the second dose second dose comprises 5 ug MenC saccharide conjugated to CRM197 carrier, the second dose suitably being administered one month after the first dose.

Clause 187. The method, glycoconjugate, use or kit according to any one of clauses 1 to 180, 185 or 186, wherein the first dose comprises 0.5 ug Men A saccharide conjugated to CRM197 carrier and the second dose second dose comprises 5 ug MenW saccharide conjugated to CRM197 carrier, the second dose suitably being administered one month after the first dose.

Clause 188. The method, glycoconjugate, use or kit according to any one of clauses 1 to 180 or 185 to 187, wherein the first dose comprises 0.5 ug Men A saccharide conjugated to CRM197 carrier and the second dose second dose comprises 5 ug MenY saccharide conjugated to CRM197 carrier, the second dose suitably being administered one month after the first dose.

Clause 189. The method, glycoconjugate, use or kit according to any one of clauses 1 to 180, wherein the first dose comprises 0.2 ug Men A saccharide conjugated to CRM197 carrier and the second dose second dose comprises 0.2 ug MenA saccharide conjugated to CRM197 carrier, the second dose suitably being administered one month after the first dose.

Clause 190. The method, glycoconjugate, use or kit according to any one of clauses 1 to 180 or 189, wherein the first dose comprises 0.1 ug Men A saccharide conjugated to CRM197 carrier and the second dose second dose comprises 0.1 ug MenC saccharide conjugated to CRM197 carrier, the second dose suitably being administered one month after the first dose.

Clause 191. The method, glycoconjugate, use or kit according to any one of clauses 1 to 180, 189 or 190, wherein the first dose comprises 0.1 ug Men A saccharide conjugated to CRM197 carrier and the second dose second dose comprises 0.1 ug MenW saccharide conjugated to CRM197 carrier, the second dose suitably being administered one month after the first dose.

Clause 192. The method, glycoconjugate, use or kit according to any one of clauses 1 to 180 or 189 to 191, wherein the first dose comprises 0.1 ug Men A saccharide conjugated to CRM197 carrier and the second dose second dose comprises 0.1 ug MenY saccharide conjugated to CRM197 carrier, the second dose suitably being administered one month after the first dose.

Clause 193. The method, glycoconjugate, use or kit according to any one of clauses 1 to 180, wherein the first dose comprises 0.2 ug Men A saccharide conjugated to CRM197 carrier and the second dose second dose comprises 10 ug MenA saccharide conjugated to CRM197 carrier, the second dose suitably being administered one month after the first dose.

Clause 194. The method, glycoconjugate, use or kit according to any one of clauses 1 to 180 or 193, wherein the first dose comprises 0.1 ug Men A saccharide conjugated to CRM197 carrier and the second dose second dose comprises 5 ug MenC saccharide conjugated to CRM197 carrier, the second dose suitably being administered one month after the first dose.

Clause 195. The method, glycoconjugate, use or kit according to any one of clauses 1 to 180, 193 or 194, wherein the first dose comprises 0.1 ug Men A saccharide conjugated to CRM197 carrier and the second dose second dose comprises 5 ug MenW saccharide conjugated to CRM197 carrier, the second dose suitably being administered one month after the first dose.

Clause 196. The method, glycoconjugate, use or kit according to any one of clauses 1 to 180 or 193 to 195, wherein the first dose comprises 0.1 ug Men A saccharide conjugated to CRM197 carrier and the second dose second dose comprises 5 ug MenY saccharide conjugated to CRM197 carrier, the second dose suitably being administered one month after the first dose.

Clause 197. The method, glycoconjugate, use or kit according to clause 179 wherein the second dose comprises a combination of Pneumococcus glycoconjugates, such as comprising a combination of serotype 1, 4, 5, 6B, 7F, 9V, 14, 18C, 19F and 23F glycoconjugates Clause 198. The method, glycoconjugate, use or kit according to clause 179 wherein the second dose comprises a combination of GBS glycoconjugates, such as comprising a combination of serotype Ia, Ib and III glycoconjugates, especially serotype Ia, Ib, II, III, IV and V glycoconjugates.

EXAMPLES

The following examples describe some exemplary modes of making and practicing the immunogenic compositions that are described herein. It should be understood that these examples are for illustrative purposes only and are not meant to limit the scope of the compositions and methods described herein.

Example 1: Immunization of Mice with GBS Saccharide Conjugates

Method

Groups of 5 week old female BALB/c mice were administered GBS 1a-CRM197 glycoconjugate (see Pinto, 2014) at a range of doses. Compositions were administered intraperitoneally on Day 1 and Day 21 in 200 ul.

| | Glycoconjugate | | First Dose | Second Dose | Aluminium (mg) |
|---|---|---|---|---|---|
| Group | PS | Carrier | (ug) | (ug) | hydroxide |
| 1 | GBS 1a | CRM197 | 1 | 1 | 0.4 |
| 2 | GBS 1a | CRM197 | 0.1 | 1 | 0.4 |
| 3 | GBS 1a | CRM197 | 0.1 | 0.1 | 0.4 |
| 4 | GBS 1a | CRM197 | 0.01 | 1 | 0.4 |
| 5 | GBS 1a | CRM197 | 0.01 | 0.01 | 0.4 |

Each group contained 10 mice.

Samples were taken on Day 0 (pre-immunisation) and Day 35 and subjected to ELISA and opsonophagocytic titer measurements against GBS type Ia strain.

ELISA

Serum antibody titers in serum samples were measured by a Luminex assay using streptavidin-derivatized magnetic microspheres (Radix Biosolutions, USA) coupled with biotinylated type Ia native polysaccharide (Buffi et al mSphere 2019 Vol 4 Issue 4 e00273-19). Following equilibration at RT, 1.25 million microspheres were transferred to LoBind tubes (Eppendorf) and placed into a magnetic separator for 2 min in the dark. Microspheres were washed with PBS containing 0.05% Tween 20 (Calbiochem) and biotin-PSIa was added to the microspheres at a final concentration of 1 pg/ml in PBS, 0.05% Tween 20, 0.5% BSA (Sigma-Aldrich). The biotin-PSIa microspheres were incubated for 60 min at RT in the dark and washed twice with PBS, 0.05% Tween 20. Coupled microspheres were suspended in 500 μl of PBS, 0.05% Tween 20, 0.5% BSA and stored at 4° C.

Eight 3-fold serial dilutions of a standard hyperimmune serum and test samples were prepared in PBS, pH 7.2, 0.05% Tween 20, 0.5% BSA. Each serum dilution (50 μl) was mixed with an equal volume of conjugated microspheres (3,000 microspheres/region/well) in a 96-well Greiner plate (Millipore Corporation) and incubated for 60 min at RT in the dark. After incubation, the microspheres were washed three times with 200 μl PBS. Each well was loaded with 50 μl of 2.5 pg/ml anti-mouse IgG secondary antibody (Jackson Immunoresearch), in PBS, pH 7.2, 0.05% Tween 20, 0.5% BSA and incubated for 60 min with continuous shaking. After washing, microspheres were suspended in 100 μl PBS and shaken before the analysis with a Luminex 200 instrument. Data were acquired in real time by Bioplex Manager TM Software (BioRad).

Opsonophagocytosis Killing Assay (OPKA)

HL60 cells were grown in RPM11640 with 10% fetal calf serum, incubated at 37° C., 5% $CO_2$. HL60 cells were differentiated to neutrophils with 0.78% dimethylformamide (DMF) and after 4-5 days were used as source of phagocytes.

The assay was conducted in 96-well microtiter plate, in a total volume of 125 uL/well. Each reaction contained heat inactivated test serum (12.5 uL), GBS Ia strain 515 Ia ($6 \times 10^4$ colony forming units [CFU]), differentiated HL60 cells ($2 \times 10^6$ cells) and 10% baby rabbit complement (Cederlane) in Hank's balanced salt solution red (Gibco). For each serum sample, six serial dilutions were tested. Negative controls lacked effector cells, or contained either negative sera or heat inactivated complement. After reaction assembly, plates were incubated at 37° C. for 1 hour under shaking. Before (To) and after ($T_{60}$) incubation, the mixtures were diluted in sterile water and plated in Trypticase Soy Agar plates with 5% sheep blood (Becton Dickinson). Each plate was then incubated overnight at 37° C. with 5% of $CO_2$ counting CFUs the next day. OPKA titre was expressed as the reciprocal serum dilution leading to 50% killing of bacteria and the % of killing is calculated as follows $$\% \text{ killing} = \frac{T_0 - T_{60}}{T_0}$$

where $T_0$ is the mean of the CFU counted at $T_0$ and $T_{60}$ is the average of the CFU counted at $T_{60}$ for the two replicates of each serum dilution.

Results

CPS 1a IgG titres at Day 35 are shown in FIG. 1 and summarised in the table below.

| | Glycoconjugate | | First Dose | Second (ug) | | OPKA |
|---|---|---|---|---|---|---|
| Group | PS | Carrier | (ug) | Dose | GMT | titre |
| 1 | GBS 1a | CRM197 | 1 | 1 | 208 | <30 |
| 2 | GBS 1a | CRM197 | 0.1 | 1 | 365 | <100 |
| 3 | GBS 1a | CRM197 | 0.1 | 0.1 | 6767 | 442 |
| 4 | GBS 1a | CRM197 | 0.01 | 1 | 534 | <30 |
| 5 | GBS 1a | CRM197 | 0.01 | 0.01 | 3964 | 114.5 |

The GMT observed for Group 3 (0.1 ug/0.1 ug) was higher than that observed for either Group 1 (1 ug/1 ug; p=0.0015) or Group 2 (0.1 ug/1 ug; p=0.023). The GMT observed for Group 5 (0.01 ug/0.01 ug) was higher than that observed for either Group 1 (1 ug/1 ug; p=0.0007) or Group 4 (0.01 ug/1 ug; p=0.0113). Opsonophagocytic titres were highest in Groups 3 and 5.

The data show that vaccination with a reduced first dose of GBS Ia glycoconjugate can increase GBS 1a GMT. In particular, vaccination with a reduced first dose and reduced second dose of glycoconjugate can substantially increase GBS 1a GMT and OPKA titre.

Example 2: Immunization of Mice with MenACWY Saccharide Conjugates

Method

Groups of mice were administered MenACWY-CRM197 glycoconjugates at a range of doses. Compositions were administered subcutaneously on Day 1 and Day 14 in 200 ul.

| | Glycoconjugate | | First Dose (ug) | | Second Dose (ug) | | Aluminium phosphate (mg) |
|---|---|---|---|---|---|---|---|
| Group | PS | Carrier | MenA | MenC, W, Y (each) | MenA | MenC, W, Y (each) | |
| 1 | MenA, C, W and Y | CRM197 | 2 | 1 | 2 | 1 | 0.4 |
| 2 | MenA, C, W and Y | CRM197 | 0.2 | 0.1 | 2 | 1 | 0.4 |
| 3 | MenA, C, W and Y | CRM197 | 0.02 | 0.01 | 2 | 1 | 0.4 |
| 4 | MenA, C, W and Y | CRM197 | 0.2 | 0.1 | 0.2 | 0.1 | 0.4 |
| 5 | MenA, C, W and Y | CRM197 | 0.02 | 0.01 | 0.02 | 0.01 | 0.4 |

Samples are taken on Day 0 (pre-immunisation) and Days 28 and 42 and subjected to ELISA against the capsular PS and serum bactericidal activity against reference strains.

ELISA

Based on an 2-step Rapid Indirect ELISA developed in house (a similar approach is described in Casini D, 2015) antigens of interest were coated on plates and react with specific antibodies present in the serum samples. Binding is revealed by a secondary anti-species specific antibody conjugated to ALP enzyme contained in the serum dilution buffer. The signal, generated by the reaction of the substrate, catalyzed by this enzyme, is proportional to the antibody concentration in the sample with a peak of absorption at 405 nm.

Briefly, wells were separately coated with a 5 pg/ml solution of each polysaccharide in PBS at pH 8.2 of each polysaccharide, incubated overnight at 2 to 8 degrees C. Cells were then washed 3 times with 350 ul of washing buffer (PBS pH 7.4; Tween 20 0.05%).

Wells were post-coated by dispensing 200 ul of Smart Block (Candor Bioscience) and incubating for 2 hrs at room temperature, before washing 3 times with 350 ul of washing buffer and then sealed by dispensing 200 ul of Liquid Plate Sealer (Candor Bioscience) and incubating for 2 hrs at room temperature.

Samples were diluted (PBS with Tween 20 0.05%; 1% BSA; Anti-Mouse IgG ALP-conjugated secondary antibody) to minimum starting dilutions of 1:500, before 2-fold serial dilutions along with appropriate standards.

Plates were incubated at 37° C. (MenA:25', MenC:20', MenW:35' and MenY:30'). Plates were washed 4 times with washing buffer and 100 µl/well of the substrate solution (3 mg/ml of p-NPP (powder) in DEA buffer) added to each well. Plates are then incubated at 37° C. MenA: 20', MenC: 25', MenW:20', MenY:20' before reading at 405 nm.

High Throughput Bactericidal Assay Using Commercial Baby Rabbit Complement (HT-rSBA)

The day before the experiment the bacterial strain under investigation is isolated on a chocolate agar plate from a frozen aliquot stock. The plate is incubated overnight at 37° C. and 5% $CO_2$. The day of the experiment the isolated colonies are inoculated in a sterile pyrex glass tube with 8 ml MHB (Mueller Hinton Broth)+0.25% glucose. If the optical density is between 0.065-0.085 at 620 nm, the culture is then incubated at 37° C. and 5% $CO_2$ until OD620 of 0.400-0.450 is reached (usually between 90-120 minutes).

Samples are appropriately prediluted with a dilution buffer (DPBS+1% BSA+0.1% glucose), then dispensed and serially diluted with 1:2 dilution steps in a 384-well clear plate.

Heat inactivated complement (HIC) and active complement (AC) are separately dispensed in a black 384-well plate.

Once the bacterial culture reaches the final OD, it is diluted with the dilution buffer and dispensed in the clear plate, then the reaction mixture is transferred to the black plate containing the HIC and AC, together with various controls. The black plate is incubated for 1 hour at 37° C. +5% $CO_2$.

Alamar Blue buffer (15% Alamar Blue in MHB+0.25% glucose) is then added. The plate is then sealed returned to the incubator. The fluorescent signal (FI) is read every 30 minutes for 16 times. Data is then analysed using an Excel macro for the bactericidal titer calculation, applying a 4PL regression model. The titer is assigned by interpolating the reciprocal serum dilution giving a 50% reduction of the FI ($IC_{50}$).

Human Bactericidal Assay Using Human Plasma as Complement Source (hSBA)

The assay is done in sterile 96 well plates in a final volume of 50 µl per well. The bactericidal assay contains two internal controls: 1) One control is the killing by complement alone in the absence of antibodies, Complement Dependent Control (CDC). The second control is killing by serum alone in presence of heat inactivated complement, Complement Independent Control (CIC). These controls are used to calculate the average of colonies at time zero (To). 50% of this value is the number of colonies considered to define the bactericidal serum dilution.

The day before the experiment the bacterial strain under investigation is isolated on a chocolate agar plate from a frozen aliquot stock. The plate is incubated for 18 hours at 37° C. and 5% $CO_2$. The day of the experiment the isolated colonies are inoculated in a 14 ml polypropylene tub with 8 ml MHB (Mueller Hinton Broth)+0.25% glucose. If the optical density is between 0.05-0.06 at 600 nm, the culture is then incubated with 150 rpm shaking at 37° C. and 5% $CO_2$ until OD600 of 0.24-0.26 is reached, equating to around $10^9$ CFU/ml (usually between 90-120 minutes).

Samples are prediluted with a dilution buffer (DPBS+1% BSA+0.1% glucose) to a final dilution of $10^5$ CFU/ml (1:10000). To 3 ml of bacterial suspension is added 30 ul of heparin stock solution (500 U/ml) and 30 ul of salt stock solution ($MgCl_2$ 1 M, $CaCl_2$ 0.15 M) resulting in a concentration of 5 U/ml Heparin, 10 mM $MgCl_2$ and 1.5 mM $CaCl_2$.

On the day of the experiment 12.5 ul/well bacteria working dilution ($10^5$ CFU/ml) is mixed with 12.5 ul/well active plasma in 96 well plates before plating at $T_0$ with 5 ul on chocolate agar plates. Agar plates are incubated at 37° C. with 5% $CO_2$. The 96 well plates are covered and incubated at 37° C. with 5% $CO_2$ for 60 minutes.

At $T_{60}$ minutes 10 ul of each well is spotted on square Petri dishes with MH agar. Controls at $T_{60}$ are plated with 5 ul on chocolate agar plates. Plates are incubated overnight at 37 C° with 5% $CO_2$.

On the following day the number of colonies (colony forming units, CFU) in each spot on each of the plates is counted. All wells are plated in duplicate and duplicate counts are recorded.

In general, the titer is calculated referring to $T_0$. The experiment is considered valid when the survival in the heat inactivated complement control and active complement control is at least 80% of $T_0$. In case $T_0$ is not valid (e.g., a problem with medium) the titer can be calculated on $T_{60}$ (in case all the $T_{60}$ controls are correct) using the average of the two counts.

For each test sample and internal control, the average of duplicates is calculated. Bactericidal titers are defined as the reciprocal serum dilution that gives a 50% decrease of CFU after 60 min incubation in the reaction mixture, compared with the mean number of CFU in the control reactions at $T_0$. The average of duplicates of a test sample has to be less or equal to 50% of the average of $T_0$ controls to be considered bactericidal.

Results

MenA, MenC, MenW and MenY IgG titres at Days 28 and 42 are shown in FIGS. 2 to 5 respectively. Bactericidal assay results for MenA, MenC, MenW and MenY at Days 28 and 42 are shown in FIGS. 6 to 9 respectively: Human bactericidal assay using human plasma as complement source (hSBA)—top panel; baby rabbit complement (HT-rSBA)—bottom panel.

As can be seen from the results, even in the context of a complex multivalent vaccine, reduced doses of glycoconjugate can result in GMT and bactericidal titres which are relatively high. In particular, low-dose priming followed by standard dose boosting can provide titers of antibodies (binding and functional) similar to or higher than those obtained with higher priming doses. Priming with a 0.2 ug dose of MenA and 0.1 ug MenC leads to SBA titers comparable to priming with a 2 ug or 1 ug dose respectively. For MenY and MenW 0.1 ug and even a 0.01 ug doses can provide priming efficiently, similar to the standard 1 ug dose in terms of SBA titers.

Example 3—Human Trial

Groups of adults 18 to 40 years are administered Men-ACWY-CRM197 glycoconjugates at a range of doses. Compositions are administered intramuscularly in a volume of 500 ul on Day 1 and at 1 Month (Groups 1 and 3 to 6) or Day 1 and at 1 Year (Group 2). Vaccines are based Menveo (10 ug:5 ug:5 ug:5 ug MenACWY, respectively) but diluted accordingly.

|  |  |  | First Dose (ug) | | Second Dose (ug) | |
|---|---|---|---|---|---|---|
| | Glycoconjugate | | | MenC, W, Y | | MenC, W, Y |
| Group | PS | Carrier | MenA | (each) | MenA | (each) |
| 1 | MenA, C, W and Y | CRM197 | 10 | 5 | 10 | 5 |
| 2 | MenA, C, W and Y | CRM197 | 10 | 5 | 10 | 5 |
| 3 | MenA, C, W and Y | CRM197 | 1 | 0.5 | 1 | 0.5 |
| 4 | MenA, C, W and Y | CRM197 | 1 | 0.5 | 10 | 5 |
| 5 | MenA, C, W and Y | CRM197 | 0.2 | 0.1 | 0.2 | 0.1 |
| 6 | MenA, C, W and Y | CRM197 | 0.2 | 0.1 | 10 | 5 |

Blood samples are taken before first dose, one month after first dose (before second dose), two months after first dose, one year after first dose (before second dose for Group 2) and one month after second dose. Blood samples are subjected to ELISA against the capsular PS and serum bactericidal activity against reference strains.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

The application of which this description and claims forms part may be used as a basis for priority in respect of any subsequent application. The claims of such subsequent application may be directed to any feature or combination of features described herein. Embodiments are envisaged as being independently, fully combinable with one another where appropriate to the circumstances to form further embodiments of the invention. They may take the form of product, composition, process, or use claims and may include, by way of example and without limitation, the claims which follow.

All publications, including but not limited to patents and patent applications, cited in this specification are herein incorporated by reference as if each individual publication were specifically and individually indicated to be incorporated by reference herein as though fully set forth.

BIBLIOGRAPHY

Acharya I. L., L. C. U., Thapa R., Gurubachaya V. L., Shrestha M. B., Cadoz M., Schulz D., Armand J., Bryla D. A., Trollfors B. et al., Prevention of typhoid fever in Nepal with the Vi capsular polysaccharide of *Salmonella typhi*. New Engl. J. Med. 1987, 317 (18), 1101-1104

Arias M A et al. (2012) Glucopyranosyl Lipid Adjuvant (GLA), a Synthetic TLR4 Agonist, Promotes Potent Systemic and Mucosal Responses to Intranasal Immunization with HIVgp140. PLoS ONE 7(7): e41144

Baraldoi et al (2004) N19 polyepitope as a carrier for enhanced immunogenicity and protective efficacy of meningococcal conjugate vaccines. Infect Immun 72; 4884-7

Berti, F and Adamo, R Antimicrobial glycoconjugate vaccines: an overview of classic and modern approaches for protein modification Chem. Soc. Rev., 2018, 47, 9015

Bhutta et al. Immunogenicity and safety of the Vi-CRM197 conjugate vaccine against typhoid fever in adults, children, and infants in south and southeast Asia: results from two randomised, observer-blind, age de-escalation, phase 2 trials. *Lancet Infect Dis*, 14 (2014) 119.

Brazolot-Millan et al., CpG DNA can induce strong Th1 humoral and cell-mediated immune responses against hepatitis B surface antigen in young mice. Proc. Natl. Acad. Sci., USA, 1998, 95:15553-8

Buffi et al., Novel Multiplex Immunoassays for Quantification of IgG against Group B *streptococcus* Capsular Polysaccharides inHuman Sera. mSphere 2019 Vol 4 Issue 4 e00273-19

Casini D, Fontani P, Ruggiero P, Balducci E, Berti D (2015) A Rapid ELISA Method to Improve the Automated Test Throughput. J Anal Bioanal Tech S13: 005. doi:10.4172/2155-9872.S13-005

Coler R N et al. (2011) Development and Characterization of Synthetic Glucopyranosyl Lipid Adjuvant System as a Vaccine Adjuvant. PLoS ONE 6(1): e16333. doi:10.1371/journal.pone.0016333

Constantino P, Size fractionation of bacterial capsular polysaccharides for their use in conjugate vaccines Vaccine 17 (1999) 1251-1263

Costantino, P.; Rappuoli, R.; Berti, F., The design of semi-synthetic and synthetic glycoconjugate vaccines. Expert Opin. Drug Discov. 2011, 6 (10), 1045-1066

Davies et al., Population-based active surveillance for neonatal group B streptococcal infections in Alberta, Canada: implications for vaccine formulation. Pediatr Infect Dis J.; 20(9): 879-884

Davis et al, CpG DNA is a potent enhancer of specific immunity in mice immunized with recombinant hepatitis B surface antigen. J. Immunol, 1998, 160:870-876

Donnelly J J, Deck R R, Liu M A Immunogenicity of a *Haemophilus influenzae* polysaccharide-*Neisseria meningitidis* outer membrane protein complex conjugate vaccine. J Immunol. 1990 Nov. 1; 145(9):3071-9.);

Dowling, D J Recent Advances in the Discovery and Delivery of TLR7/8 Agonists as Vaccine Adjuvants. Immunohorizons. 2018 Jul. 2; 2(6):185-197

Edmond, et al., Group B streptococcal disease in infants aged younger than 3 months: systematic review and meta-analysis. The Lancet, 379 (9815): 547-546 (2012).

Falugi et al Rationally designed strings of promiscuous CD4(+) T cell epitopes provide help to *Haemophilus influenzae* type b oligosaccharide: a model for new conjugate vaccines. (2001) Eur J Immunol 31

Geno, K. A.; Gilbert, G. L.; Song, J. Y.; Skovsted, I. C.; Klugman, K. P.; Jones, C.; Konradsen, H. B.; Nahm, M. H., Pneumococcal Capsules and Their Types: Past, Present, and Future. *Clin Microbiol Rev* 2015, 28 (3), 871-99

Greenberg, R. et al. Sequential administration of 13-valent pneumococcal conjugate vaccine and 23-valent pneumococcal polysaccharide vaccine in pneumococcal vaccine—naïve adults 60-64 years of age Vaccine 32 (2014) 2364-2374 Guttormsen et al., Rational chemical design of the carbohydrate in a glycoconjugate vaccine enhances IgM-to-IgG switching. Proc Natl Acad Sci USA, 105(15): 5903-8. Epub 2008 Mar. 31 (2008).

Hoare and Koshland A method for the quantitative modification and estimation of carboxylic acid groups in proteins. 1967 JBC 242:2447-2453

Jackson, L. et al. Influence of initial vaccination with 13-valent pneumococcal conjugate vaccine or 23-valent pneumococcal polysaccharide vaccine on anti-pneumococcal responses following subsequent pneumococcal vaccination in adults 50 years and older Vaccine 31 (2013) 3594-3602

Jodar et al. Serological criteria for evaluation and licensure of new pneumococcal conjugate vaccine formulations for use in infants. Vaccine, (21) 2003, p. 3265-3272

Jonker, E. F. F.; van Ravenhorst, M. B.; Berbers, G. A. M.; Visser, L. G., Safety and immunogenicity of fractional dose intradermal injection of two quadrivalent conjugated meningococcal vaccines. Vaccine 2018, 36(26):3727-3732

Klugman K. P., G. I. T., Koornhof H. J., Robbins J. B., Schneerson R., Schultz D., Cadoz M., Armand J., Protective activity of Vi capsular polysaccharide vaccine against typhoid fever. *Lancet* 1987, 2 (8569), 1165-1169

Krieg, CpG motifs in bacterial DNA trigger direct B-cell activation. Nature 374:546 (1995)).

(Kuo et al Characterization of a recombinant pneumolysin and its use as a protein carrier for pneumococcal type 18C conjugate vaccines. (1995) Infect Immun 63; 2706-13

Lin, et al., Capsular polysaccharide types of group B streptococcal isolates from neonates with early-onset systemic infection. J Infect Dis. 177(3):790-792 (1998).

Lindahl et al., Nonimmunodominant Regions Are Effective As Building Blocks In A Streptococcal Fusion Protein Vaccine, Cell Host & Microbe 2:427-434 (2007).

Lowry et al., Protein measurement with the folin phenol reagent. J. Biol. Chem. 193, 265-275 (1951).

Madhi et al., Considerations for a phase-III trial to evaluate a Group B *Streptococcus* polysaccharide-protein conjugate vaccine in pregnant women for the prevention of early- and late-onset invasive disease in young infants. Vaccine 31 (Suppl. 4), D52-D57 (2013).

Maeland et al, Survey of Immunological Features of the Alpha-Like Proteins of *Streptococcus agalactiae*, Clinical and Vaccine Immunology, 22(2) (2015).

McCluskie and Davis, CpG DNA is a potent enhancer of systemic and mucosal immune responses against hepatitis B surface antigen with intranasal administration to mice. J. Immunol., 1998, 161:4463-6

Micoli et al. Production of a conjugate vaccine for *Salmonella enterica* serovar *Typhi* from *Citrobacter* Vi. Vaccine 2012 Jan. 20; 30(5):853-61

Micoli, F et al Glycoconjugate vaccines: current approaches towards faster vaccine design Expert Review of Vaccines 2019 DOI: 10.1080/14760584.2019.1657012

Nakajima and Ikada 1995 Bioconjugate Chem. 6:123-130; Hoare and Koshland 1967 JBC 242:2447-2453

Pace, D.; Pollard, A. J., Meningococcal A, C, Y and W-135 polysaccharide-protein conjugate vaccines. *Arch Dis Child* 2007, 92 (10), 909-15

Pace, D., Glycoconjugate vaccines. Expert Opin. Biol. Ther. 2013, 13 11-33

Peterson et al., Review of the folin phenol protein quantitation method of lowry, rosebrough, farr and randall. Analytical Biochemistry 100, 201-220 (1979).

Phares et al., Epidemiology of invasive group b streptococcal disease in the United States. 1999-2005, JAMA 299 (17):2056-65 (2008).

Rappuoli, R., Glycoconjugate vaccines: Principles and mechanisms *Sci. Transl. Med.* 2018 10, eaat4615

Rondini et al., Characterization of *Citrobacter* sp. line 328 as a source of Vi fora Vi-CRM(197) glycoconjugate vaccine against *Salmonella Typhi*. J. Infect. Dev Ctries, 2012

Pichichero Protein carriers of conjugate vaccines: characteristics, development, and clinical trials. *Hum Vaccin Immunother.* 2013 Dec. 1; 9(12): 2505-2523.

Nicholls and Youle, in Genetically Engineered Toxins, Ed: Frankel, Maecel Dekker Inc, 1992.

Pinto, V and Berti, F Exploring the Group B *Streptococcus* capsular polysaccharides: The structural diversity provides the basis for development of NMR-based identity assays *Journal of Pharmaceutical and Biomedical Analysis* 98 (2014) 9-15

Ramsay, M. E.; Andrews, N. J.; Trotter, C. L.; Kaczmarski, E. B.; Miller, E., Herd immunity from meningococcal serogroup C conjugate vaccination in England: database analysis. *BMJ* 2003, 326, 365-366

Schneerson, R.; Barrera, O.; Sutton, A.; Robbins, J. B., Preparation, characterization, and immunogenicity of *Haemophilus influenzae* type b polysaccharide-protein conjugates. *J. Exp. Med.* 1980, 152, 361-376

Szu et al. Ultrasonic irradiation of bacterial polysaccharides. Characterization of the depolymerized products and some applications of the process. Carbohydrate Research Vol 152 p 7-20 (1986)

Tacket C. O., L. M. M., Robbins J. B., Persistence of antibody titres three years after vaccination with Vi polysaccharide vaccine against typhoid fever. Vaccine 1988, 6 (4), 307-308

Uchida et al., Diphtheria toxins and related proteins. J. Biol. Chem. 218; 3838-3844, (1973).

van Damme et al., Safety, Immunogenicity and Dose Ranging of a New Vi-CRM197 Conjugate Vaccine against Typhoid Fever: Randomized Clinical Testing in Healthy Adults PlosOne 2011

The invention claimed is:

1. A method of administering a glycoconjugate to a subject, the method comprising the steps of:
   (i) administering a first dose of 0.005 to 2 µg of glycoconjugate;
   (ii) subsequently administering a second dose of 1 to 30 µg of glycoconjugate, wherein the amount of glycoconjugate in the second dose is at least twice the amount of glycoconjugate in the first dose, wherein the glycoconjugate comprises a saccharide derived from Group B *Streptococcus*.

2. The method according to claim 1, wherein the glycoconjugate comprises a carrier which is tetanus toxoid, a fragment thereof, or a non-toxic mutant thereof.

3. The method according to claim 1, wherein the glycoconjugate comprises a carrier which is diphtheria toxoid, a fragment thereof, or a non-toxic mutant thereof.

4. The method according to claim 1, wherein the glycoconjugate comprises a carrier which is an outer membrane protein complex (OMPC).

5. The method according to claim 1, wherein the glycoconjugate comprises a carrier which is a *H. influenzae* protein D.

6. The method according to claim 1, wherein the second dose is administered 3 weeks to 12 months after the first dose.

7. A kit comprising:
   (i) a first dose of glycoconjugate;
   (ii) a second dose of glycoconjugate; wherein the first dose is 0.005 to 2 µg of glycoconjugate; wherein the second dose is 1 to 30 µg of glycoconjugate, wherein the amount of glycoconjugate in the second dose is at least twice the amount of glycoconjugate in the first dose, wherein the glycoconjugate comprises a saccharide derived from Group B *Streptococcus*.

8. The method of claim 1, wherein Group B *Streptococcus* is selected from the following group: Ia, Ib, II, III, IV, V, VI, or VII.

* * * * *